(12) United States Patent
Yoshida et al.

(10) Patent No.: US 11,174,388 B2
(45) Date of Patent: Nov. 16, 2021

(54) POLYPHENYLENE SULFIDE RESIN COMPOSITION AND MOLDED ARTICLE

(71) Applicant: Toray Industries, Inc., Tokyo (JP)

(72) Inventors: Tomoya Yoshida, Nagoya (JP); Hiroyuki Isago, Nagoya (JP); Takeshi Unohara, Nagoya (JP); Hideki Matsumoto, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 202 days.

(21) Appl. No.: 16/473,322

(22) PCT Filed: Feb. 15, 2018

(86) PCT No.: PCT/JP2018/005180
§ 371 (c)(1),
(2) Date: Jun. 25, 2019

(87) PCT Pub. No.: WO2018/151191
PCT Pub. Date: Aug. 23, 2018

(65) Prior Publication Data
US 2019/0367730 A1    Dec. 5, 2019

(30) Foreign Application Priority Data

Feb. 16, 2017   (JP) .............................. JP2017-026695

(51) Int. Cl.
*C08L 81/04*   (2006.01)
*B29C 45/00*   (2006.01)
(Continued)

(52) U.S. Cl.
CPC .......... *C08L 81/04* (2013.01); *B29C 45/0001* (2013.01); *C08G 75/14* (2013.01);
(Continued)

(58) Field of Classification Search
CPC .. C08G 75/14; B29K 2995/0077; C08L 81/02
See application file for complete search history.

(56) References Cited

U.S. PATENT DOCUMENTS 4,965,297 A    10/1990  Funami et al.
2010/0331463 A1   12/2010  Yoshino et al.
(Continued)

FOREIGN PATENT DOCUMENTS

EP    0286257 A2    10/1988
JP    7-70436       3/1995
(Continued)

OTHER PUBLICATIONS

Espacenet Translation of JP H08231851 (Year: 2021).*
Google Translation of JP 2009263635 (Year: 2021).*

*Primary Examiner* — Michael M Dollinger
(74) *Attorney, Agent, or Firm* — DLA Piper LLP (US)

(57) ABSTRACT

A polyphenylene sulfide resin composition exhibits excellent initial toughness and toughness after a long-term high temperature treatment typified by a tensile elongation at break after a dry heat treatment without impairing mechanical strength, chemical resistance and electrical insulation properties. The polyphenylene sulfide resin composition includes 0.01 to 10 parts by weight of an organosilane compound and 0.01 to 5 parts by weight of a metal salt of phosphorus oxoacid based on 100 parts by weight of a polyphenylene sulfide resin, and a tensile elongation at break, which is measured in accordance with ASTM-D638 under the conditions of a tensile speed of 10 mm/min and an ambient temperature of 23° C. after treating at 200° C. for 500 hours using an ASTM No. 4 dumbbell test piece obtained by injection molding the composition, is 10% or more.

13 Claims, 3 Drawing Sheets

(51) Int. Cl.
*C08G 75/14* (2006.01)
*B29K 81/00* (2006.01)
*B29K 105/00* (2006.01)

(52) U.S. Cl.
CPC .. *B29K 2081/04* (2013.01); *B29K 2105/0005* (2013.01); *B29K 2105/0094* (2013.01); *B29K 2995/0017* (2013.01); *B29K 2995/0077* (2013.01); *B29K 2995/0088* (2013.01); *B29K 2995/0089* (2013.01); *C08L 2203/202* (2013.01); *C08L 2207/02* (2013.01)

(56) References Cited

U.S. PATENT DOCUMENTS

| | | |
|---|---|---|
| 2013/0196104 A1 | 8/2013 | Matsumoto et al. |
| 2015/0166731 A1* | 6/2015 | Sattich .................... C08K 7/14 |
| | | 525/537 |

FOREIGN PATENT DOCUMENTS

| | | |
|---|---|---|
| JP | H08-231851 A | 9/1996 |
| JP | 2004-182753 | 7/2004 |
| JP | 2009-203472 | 9/2009 |
| JP | 2009-263635 | 11/2009 |
| WO | 2009/096400 | 8/2009 |
| WO | 2009/096401 | 8/2009 |

* cited by examiner

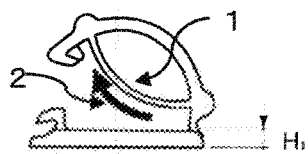 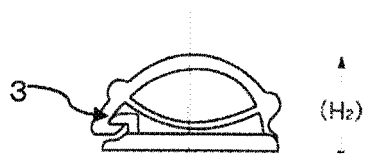 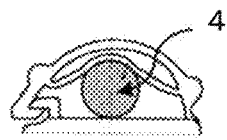
FIG. 1(A)  FIG. 1(B)  FIG. 1(C)
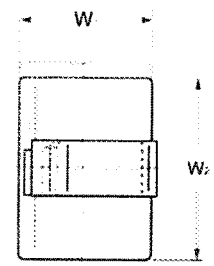 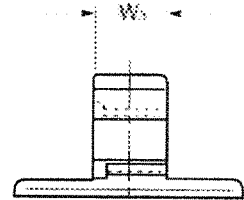
FIG. 1(D)  FIG. 1(E)
FIG. 2
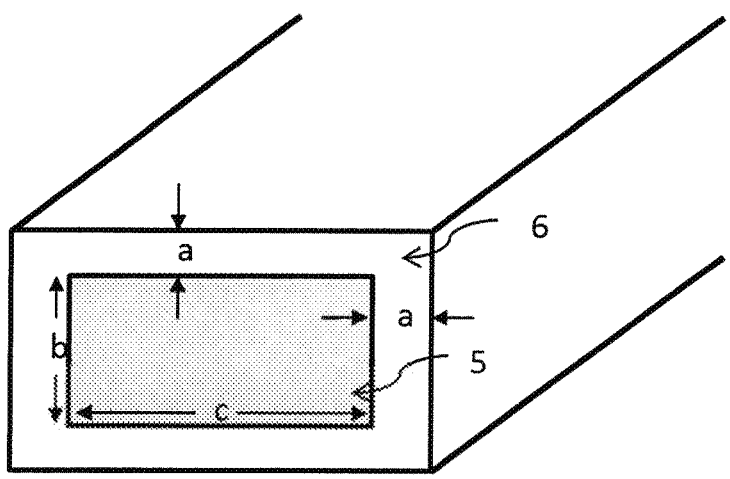

POLYPHENYLENE SULFIDE RESIN COMPOSITION AND MOLDED ARTICLE

TECHNICAL FIELD

This disclosure relates to a polyphenylene sulfide resin composition having excellent initial toughness and toughness after a long-term high temperature treatment.

BACKGROUND

Polyphenylene sulfide resins (hereinafter sometimes abbreviated to PPS) have excellent properties as an engineering plastic such as excellent heat resistance, chemical resistance and electrical insulation properties. Therefore, the polyphenylene sulfide resins have widely been used in electrical and electronic components, communication equipment components, automotive materials and the like. However, these problems are pointed out: the polyphenylene sulfide resins have low toughness and are embrittled and degraded when subjected to a long-term high-temperature heat treatment. Due to market demands such as higher output, weight saving, cost reduction and the like of automobiles in recent days, there has been required PPS resin materials that maintain toughness even after a long-term high-temperature heat treatment. There have been reported many improvement methods of imparting toughness by mixing a flexible elastomer with a PPS resin for the purpose of improving the toughness. However, there was a problem that the toughness is significantly degraded after a long-term high-temperature heat treatment due to low heat resistance of the elastomer.

Therefore, there have been reported several attempts to improve toughness and heat resistance without using the elastomer. For example, Japanese Unexamined Patent Publication (Kokai) No. 7-70436 discloses a PPS resin composition in which polytetrafluoroethylene having a number average molecular weight of 2,000,000 to 9,000,000 is added to PPS. Japanese Unexamined Patent Publication (Kokai) No. 2004-182753 discloses a PPS resin composition in which an aromatic polyester is added to PPS. WO 2009/096400 A discloses a PPS resin composition in which an aromatic polyamide is added to PPS.

However, the PPS resin compositions mentioned in Japanese Unexamined Patent Publication (Kokai) No. 7-70436 and WO 2009/096400 A are excellent in temporary heat resistance required to the material used in a reflow furnace or the like, but toughness is significantly reduced after a long-term high-temperature heat treatment for 500 hours or more. The PPS resin composition mentioned in Japanese Unexamined Patent Publication (Kokai) No. 2004-182753 is capable of improving the glass transition temperature and can be continuously used in a hot water environment, but the toughness is degraded after a long-term high-temperature heat treatment at higher than 150° C.

The PPS resins mentioned in JP 7-70436, JP 2004-182753 and WO 2009/096400 A had a problem that the toughness after the long-term high-temperature heat treatment cannot be sufficiently improved, thus failing to be employed as engine and motor peripheral members of high-power hybrid vehicles or motor peripheral members of electric vehicles, which are strongly required to have heat resistance.

It could therefore be helpful to provide a polyphenylene sulfide resin composition that is excellent in initial toughness and toughness after a long-term high-temperature heat treatment possessed inherently by a polyphenylene sulfide resin without impairing physical properties, and can be employed as engine and motor peripheral members of high-power hybrid vehicles or motor peripheral members of electric vehicles.

SUMMARY

We found that it is possible to obtain a PPS resin composition that specifically exhibits initial elongation and toughness after a long-term high temperature treatment without impairing physical properties, by mixing specific amounts of an organosilane compound and a metal salt of phosphorus oxoacid with a polyphenylene sulfide resin. It is also possible for the PPS resin composition to obtain a molded article that is further excellent in a tensile elongation at break after a long-term high temperature treatment, by mixing with a polyetherimide resin, a polyethersulfone resin and a fluororesin to prepare a resin composition.

We thus provide:

(1) A polyphenylene sulfide resin composition obtained by mixing 100 parts by weight of a polyphenylene sulfide resin with 0.01 to 10 parts by weight of an organosilane compound and 0.01 to 5 parts by weight of a metal salt of phosphorus oxoacid, wherein a tensile elongation at break, which is measured in accordance with ASTM-D638 under the conditions of a tensile speed of 10 mm/min and an ambient temperature of 23° C. after treating at 200° C. for 500 hours using an ASTM No. 4 dumbbell obtained by injection molding the composition, is 10% or more.

(2) A method of producing the above polyphenylene sulfide resin composition, which includes melt-kneading raw materials comprising a polyphenylene sulfide resin, an organosilane compound and a metal salt of phosphorus oxoacid using a twin-screw extruder, wherein a ratio L/D of a screw length L to a screw diameter D in a twin-screw extruder is 10 or more, a screw arrangement includes a stirring screw with cutouts, and a ratio of the total length of the stirring screw section with cutouts to the screw length L is 3 to 20%.

(3) A molded article including the above polyphenylene sulfide resin composition.

It is possible to obtain a polyphenylene sulfide resin composition that is excellent in initial toughness and toughness after a long-term high temperature treatment typified by a tensile elongation at break after a dry heat treatment without impairing physical properties, by mixing specific ratios of an organosilane compound and a metal salt of phosphorus oxoacid with a PPS resin.

These properties are particularly important for in-vehicle members used for a long time under a high temperature environment at 150° C. or higher, especially covering members for electric wires, from the viewpoint of preventing degradation of insulation properties due to cracking, and the polyphenylene sulfide resin composition of the present invention can be suitably used for these applications. Since the polyphenylene sulfide resin composition is also excellent in stress retention rate mentioned later, it can be suitably used as members which are used on the premise of receiving an external force intermittently or over a long period, especially power transmission members such as steering gear members and shape retaining members such as plastic fasteners, from the viewpoint of shape retention.

It is also possible for a resin composition prepared by mixing a polyetherimide resin, a polyethersulfone resin and a fluororesin with the PPS resin to obtain a molded article which is more excellent in tensile elongation at break after a long-term high temperature treatment.

BRIEF DESCRIPTION OF THE DRAWINGS

FIGS. 1(A)-(E) are schematic views of a plastic fastener used for evaluation of products in the Examples. (A) shows a cross-sectional view of the plastic fastener before fitting. (B) shows a cross-sectional view of the plastic fastener when fitted. (C) shows a cross-sectional view of the plastic fastener when a cable is disposed at the center and then fitted. (D) shows a top view of the plastic fastener when fitted. (E) shows a side view of the plastic fastener when fitted.

FIG. 2 is a schematic view of a flat wire used for evaluation of products in Examples.

REFERENCE SIGNS LIST

Figure 3:
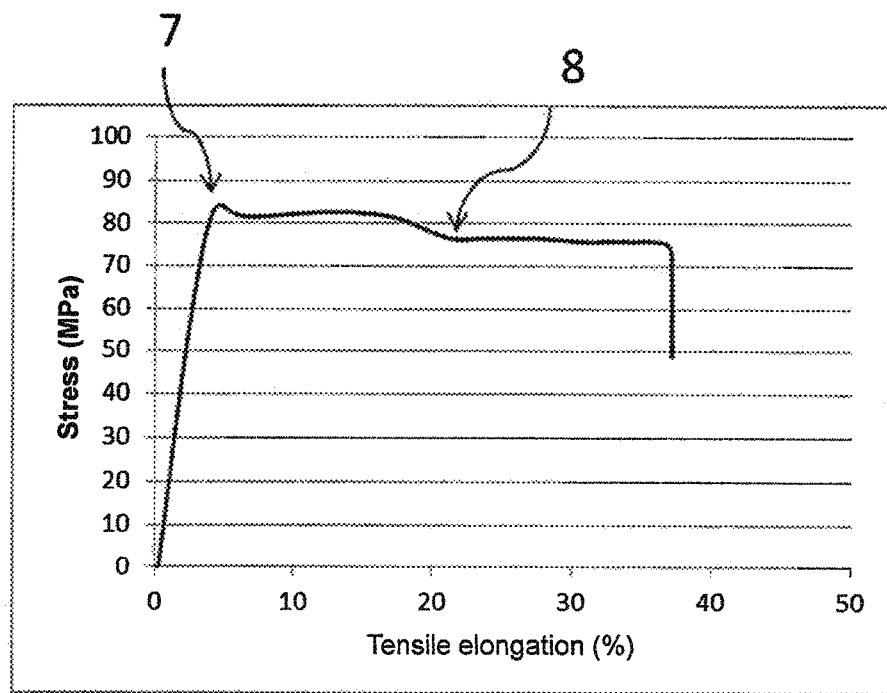
FIG. 3 is a stress-strain curve of a molded article using a composition obtained in Example 3.

1. Inner spring portion
2. Resin flow direction
3. Fitting portion
4. Wiring (Cable)
5. Copper wire
6. Coating resin
7. Upper yield point
8. Lower yield point

DETAILED DESCRIPTION

Examples will be described in detail below.
(a) Polyphenylene Sulfide Resin

The PPS resin is a polymer including a repeating unit represented by the following structural formula.

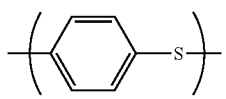

From the viewpoint of the heat resistance, the PPS resin is preferably a polymer containing 70 mol % or more, and more preferably 90 mol % or more of a polymer including the repeating unit represented by the above structural formula. In the PPS resin, 30 mol % or less of the repeating unit may be composed of a repeating unit having the following structure.

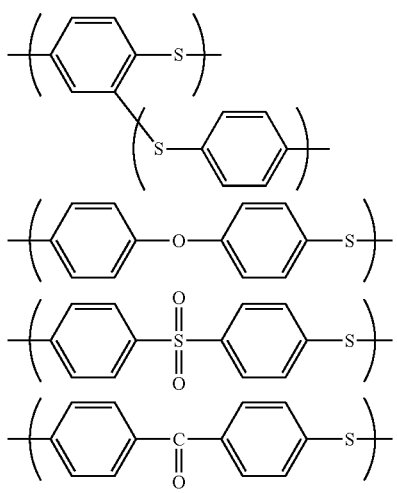

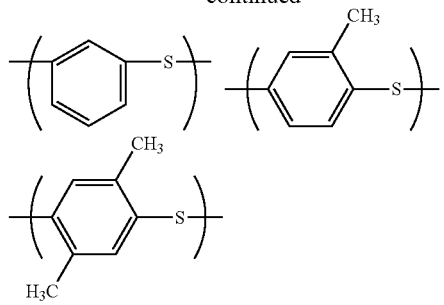

The PPS copolymer partially having such a structure is advantageous in formability because the melting point is lowered.

There is no particular imitation on melt viscosity of the PPS resin. To obtain more excellent tensile elongation at break, the melt viscosity is preferably higher. The melt viscosity is, for example, preferably in a range exceeding 30 Pa·s (at 300° C. and a shear rate of 1,000/sec), more preferably 50 Pa·s or more, and still more preferably 100 Pa·s or more. The upper limit of the melt viscosity is preferably 600 Pa·s or less in view of retaining the melt fluidity. The melt viscosity in the present invention is a value measured under the conditions of 300° C. and a shear rate of 1,000/sec using Capilograph manufactured by Toyo Seiki Seisaku-sho, Ltd.

From the viewpoint of improving the reactivity with the organosilane compound, the total content of the alkali metal and the alkaline earth metal to be mixed in the PPS resin is preferably less than 400 ppm, more preferably less than 200 ppm, and still more preferably 100 ppm. There is no lower limit in particular in the total content of the alkali metal and the alkaline earth metal contained in the PPS resin. It is not preferable that the total content of the alkali metal and the alkaline earth metal contained in the PPS resin is 1,000 ppm or more since the reactivity of the PPS resin and the organic silane compound may be degraded.

The total content of the alkali metal and the alkaline earth metal of the PPS resin as used herein is a value obtained by atomic absorption spectrometry using an aqueous solution prepared by ashing 5 g of a PPS resin in an electric furnace at 500° C. and diluting the ash with a 0.1 N aqueous hydrochloric acid solution and a 0.1% aqueous lanthanum chloride solution as a sample and using an atomic absorption spectrophotometer AA-6300 manufactured by Shimadzu Corporation.

The PPS resin can also be used after increasing the molecular weight by heating in an oxygen atmosphere after completion of the polymerization, or by a thermal oxidative crosslinking treatment due to heating after the addition of a crosslinking agent such as a peroxide. From the viewpoint of exhibiting excellent elongation after a dry heat treatment, it is preferable to produce a PPS resin composition using, as a raw material, a substantially linear PPS resin whose molecular weight is not increased by the thermal oxidative crosslinking treatment, or a semi-crosslinked PPS resin which has been slightly subjected to the oxidative crosslinking treatment.

From the viewpoint of exhibiting excellent elongation after the dry heat treatment, the number average molecular weight of the PPS resin to be mixed is preferably 10,000 or more, and more preferably 13,000 or more. It is not preferable that the number average molecular weight of the PPS resin is less than 10,000 because of insufficient entanglement of molecular chains. The upper limit of the number average molecular weight of the PPS resin is not particularly limited, and is preferably 50,000 or less from the viewpoint of the processability.

The number average molecular weight (Mn) of the PPS resin as used herein is a value calculated in terms of polystyrene using gel permeation chromatography (GPC).

(b) Organosilane Compound

It is indispensable to mix an organosilane compound in the PPS resin composition. The organosilane compound is preferably an organosilane compound having at least one functional group selected from an isocyanate group, an epoxy group, an amino group, a hydroxyl group, a mercapto group, an ureido group and an alkoxy group. Of these compounds, an alkoxysilane compound having an isocyanate group is preferable. Specific examples are preferably isocyanate-modified silicone, epoxy-modified silicone, amino-modified silicone, carbinol-modified silicone, carboxyl-modified silicone, mercapto-modified silicone, ureido-modified silicone, 3-glycidoxypropyltrimethoxysilane, 3-glycidoxypropyltriethoxysilane, 3-glycidoxypropylmethyldimethoxysilane, 3-glycidoxypropylmethyldiethoxysilane, 2-(3,4-epoxycyclohexyl)ethyltrimethoxysilane, N-(2-aminoethyl)-3-aminopropyltrimethoxysilane, N-(2-aminoethyl)-3-aminopropylmethyldimethoxysilane, 3-aminopropyltrimethoxysilane, 3-aminopropyltriethoxysilane, 3-aminopropylmethyldiethoxysilane, N-phenylaminomethyltrimethoxysilane, N-phenylaminopropyltrimethoxysilane, dimethoxymethyl-3-piperazinopropylsilane, 3-piperazinopropyltrimethoxysilane, 3-isocyanatepropyltrimethoxysilane, 3-isocyanatepropyltriethoxysilane, 3-isocyanatepropylmethyldimethoxysilane, 3-isocyanatepropylmethyldiethoxysilane, 3-isocyanatepropylethyldimethoxysilane, 3-hydroxypropyltrimethoxysilane, 3-mercaptopropyltrimethoxysilane, 3-mercaptopropyltriethoxysilane, 3-mercaptomethyldimethoxysilane, γ-ureidopropyltrimethoxysilane and the like.

Of the above-mentioned organosilane compounds, at least one organosilane compound selected from 3-isocyanatepropyltriethoxysilane, 3-aminopropyltriethoxysilane and 2-(3,4-epoxycyclohexyl)ethyltriethoxysilane is preferable from the viewpoint of the reactivity and handleability.

These organosilane compounds can be used alone or in the form of a mixture of two or more.

The mixing amount of the organosilane compound is indispensably 0.01 to 10 parts by weight, preferably 0.1 to 5 parts by weight, and more preferably 0.3 to 3 parts by weight, based on 100 parts by weight of the PPS resin. It is not preferable from the viewpoint of the processability that the mixing amount of the organosilane compound exceeds 10 parts by weight since the viscosity of the obtained PPS resin composition significantly increases. It is not preferable that the mixing amount of the organosilane compound is less than 0.01 part by weight since the reaction between the PPS and the organosilane compound becomes insufficient, thus failing to obtain excellent initial toughness and tensile elongation at break after a long-term high-temperature treatment. Although expression mechanism of these properties is not clear, it is presumed that these properties are attributable to the entanglement of molecular chains formed by the reaction, the network structure and the formation of a crosslinked structure.

(c) Metal Salt of Phosphorus Oxoacid

It is indispensable to mix an oxo acid metal salt of phosphorus in the PPS resin composition. When only the PPS resin and the organic silane compound are mixed, the reaction between the two does not proceed sufficiently, thus failing to obtain desired initial toughness and toughness after a long-term high-temperature treatment.

The metal salt of phosphorus oxoacid is preferably a metal salt of acids selected from phosphorous acid, phosphoric acid, phosphinic acid, phosphonic acid, diphosphoric acid and triphosphoric acid, and more preferably a metal salt of phosphinic acid. Specific examples thereof include potassium phosphinate, sodium phosphinate, calcium phosphinate, aluminum phosphinate, aluminum diethylphosphinate, zinc phosphinate, magnesium phosphinate and the like. Of these salts, a metal salt of phosphinic acid is preferable from the viewpoint of the concentration of phosphorus and the handleability, and sodium phosphinate is more preferable.

These oxoacid metal salts of phosphorus can be used alone or in the form of a mixture of two or more.

The mixing amount of the metal salt of phosphorus oxoacid is indispensably 0.01 to 5 parts by weight, preferably 0.05 to 3 parts by weight, more preferably 0.1 to 1 part by weight, and still more preferably 0.1 to 0.8 part by weight, based on 100 parts by weight of the PPS resin. It is not preferable that the mixing amount of the metal salt of phosphorus oxoacid exceeds 5 parts by weight since a large amount of gas is generated during a dry heat treatment and microvoids are easily formed. It is not preferable that the mixing amount of the metal salt of phosphorus oxoacid is less than 0.01 part by weight since the reaction between the PPS resin and the organic silane compound does not proceed sufficiently.

(d) Resins Other than PPS

The polyphenylene sulfide resin composition can be used after further mixing with a polyetherimide resin, a fluororesin, a polyamide resin, a polybutylene terephthalate resin, a polyethylene terephthalate resin, a modified polyphenylene ether resin, a polysulfone resin, a polyaryl sulfone resin, a polyketone resin, a polyarylate resin, a liquid crystal polymer, a polyether ketone resin, a polythioether ketone resin, a polyether ether ketone resin, a polyimide resin, a polyamide imide resin, a fluorine-based resin having no functional group, an olefin-based polymer or copolymer having no epoxy group, such as an ethylene/butene copolymer and the like.

For the purpose of modification, it is possible to add the following compounds: plasticizers such as polyalkylene oxide oligomer-based compounds, thioether-based compounds, ester-based compounds and organophosphorus-based compounds; crystal nucleating agents such as organophosphorus compounds and polyether ether ketones; metal soaps such as montanic acid waxes, lithium stearate and aluminum stearate; mold release agents such as ethylenediamine-stearic acid-sebacic acid polycondensate and silicone-based compounds; and conventional additives such as water, lubricants, UV inhibitors, coloring agents and blowing agents. The mixing amount of the above compounds is preferably 20% by weight or less, more preferably 10% by weight or less, and still more preferably 1% by weight or less, since properties inherent in the PPS resin composition of the present invention may be impaired if the mixing amount exceeds 20% by weight of the whole composition.

Particularly, to obtain a composition making use of properties of the PPS resin composition, it is preferable to mix a resin selected from a polyetherimide resin, a polyethersulfone resin and a fluororesin.

(e) Polyetherimide Resin

The polyetherimide resin is a polymer including an aliphatic, alicyclic or aromatic ether unit, and a cyclic imide group as a repeating unit. As long as the desired effects are not impaired, structural units other than a cyclic imide and an ether bond, for example, an ester unit, an oxycarbonyl unit and the like may be included in the main chain of polyetherimide.

As specific polyetherimide, a polymer represented by the following general formula is preferably used.

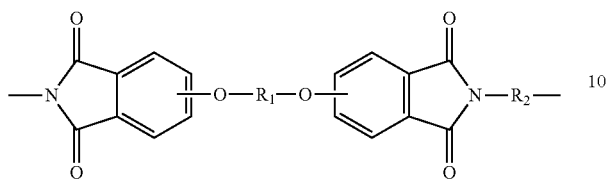

In the formula, $R_1$ is a divalent aromatic residue having 6 to 30 carbon atoms. $R_2$ is a divalent organic group selected from the group consisting of a divalent aromatic residue having 6 to 30 carbon atoms, an alkylene group having 2 to 20 carbon atoms, a cycloalkylene group having 2 to 20 carbon atoms, and a polydiorganosiloxane group chain-terminated by an alkylene group having 2 to 8 carbon atoms. As aforementioned $R_1$ and $R_2$, for example, groups represented by the following formulas are preferably used. "a" in the following formula is an integer of 2 to 20.

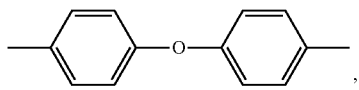

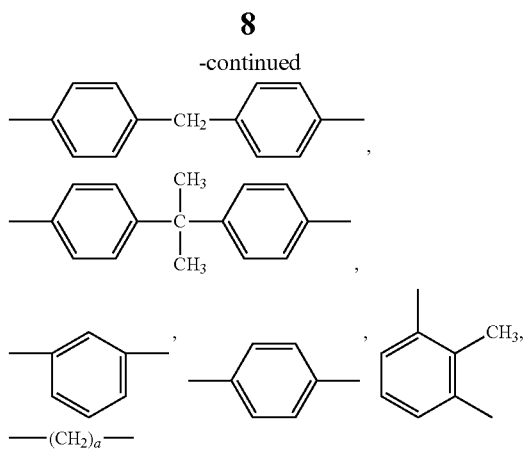

From the viewpoint of the melt moldability, cost and the like, a condensate including a structural unit represented by any one of the following formulas of 2,2-bis[4-(2,3-dicarboxyphenoxy)phenyl]propane dianhydride and m-phenylenediamine or p-phenylenediamine is preferably used as the polyetherimide resin. This polyetherimide is commercially available from SABIC INNOVATIVE PLASTICS LIMITED under the trade name of "Ultem" (registered trademark). Each of b and c in the following formula is 30 to 120.

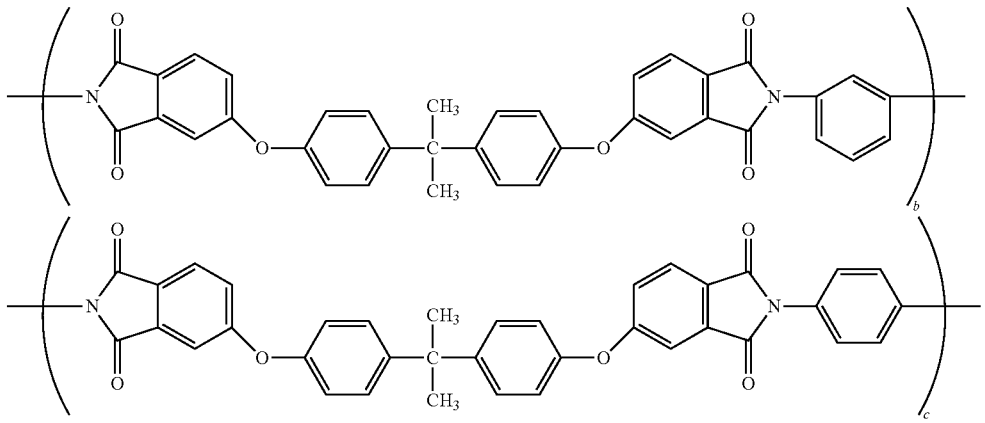

Of the above-mentioned resins, a poly(etherimide-siloxane) copolymer is preferably used as the polyetherimide resin. Examples of the poly(etherimide-siloxane) copolymer include conventionally known copolymers composed of a repeating unit of polyetherimide and a repeating unit of polysiloxane. Preferably, the copolymer is composed of a repeating unit represented by structural formula (I) and a repeating unit represented by structural formula (II).

(I)

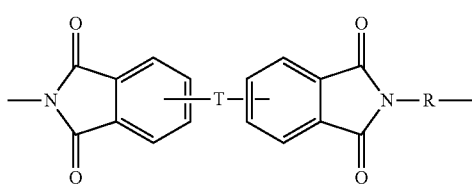

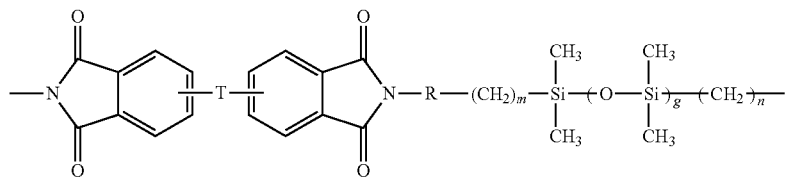

T in structural formulas (I) and (II) is —O— or —O—Z—O—, and a divalent bond exists at the 3,3'-, 3,4'-, 4,3'- and 4,4'-positions. Z is a divalent group represented by the following structural formula:

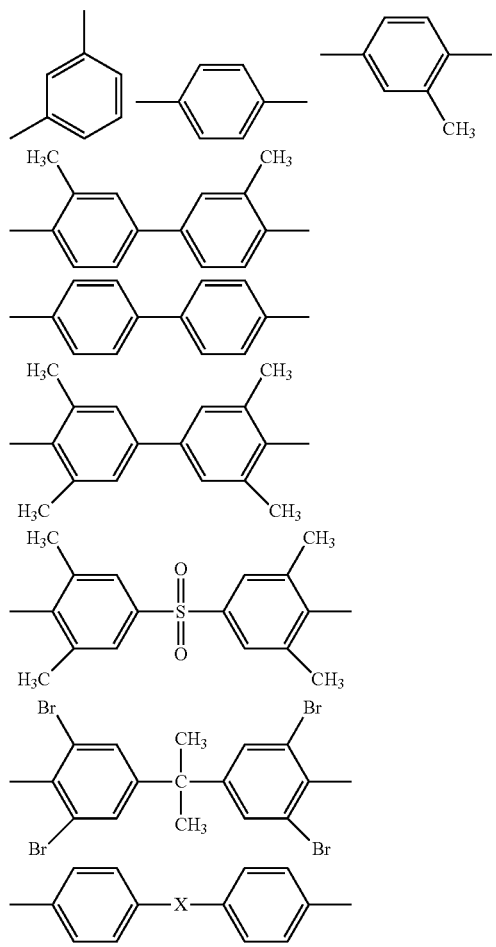

wherein X is a divalent group selected from the group consisting of a $C_{1-5}$ alkylene group or halogenated derivatives thereof, —CO—, —SO$_2$—, —O—, and —S—.

R in structural formulas (I) and (II) is a divalent organic group selected from the group consisting of an aromatic hydrocarbon group having 6 to 20 carbon atoms and halogenated derivatives thereof, an alkylene group having 2 to 20 carbon atoms, a cycloalkylene group having 3 to 20 carbon atoms and a group represented by the following structural formula. Q is a divalent group selected from the group consisting of a $C_{1-5}$ alkylene group or halogenated derivatives thereof, —CO—, —SO$_2$—, —O—, and —S—.

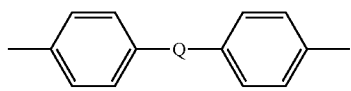

Each of m and n in structural formula (II) is an integer of 1 to 10, and g is an integer of 1 to 40.

Particularly preferable polyetherimide resin includes, in addition to structures of formulas (I) and (II), a repeating unit represented by the following formula.

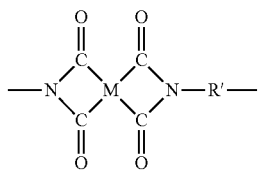

M in the above structural formula is a group selected from the group represented by the following formulas. B in the formula is —S— or —CO—.

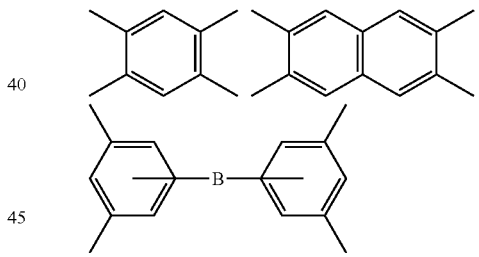

R' is the same as R defined above, or a divalent group represented by the following structural formula. Each of m and n in the formula is an integer of 1 to 10, and g is an integer of 1 to 40.

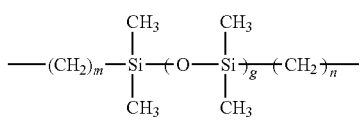

The above-mentioned poly(etherimide-siloxane) copolymer is produced by partially or entirely replacing an organic diamine of the following structural formula:

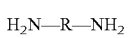

by an amine-terminated organosiloxane represented by the following formula:

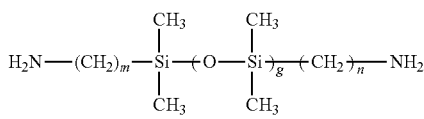

in a known method in which polyetherimide is produced from an aromatic bis(ether anhydride) represented by the following structural formula:

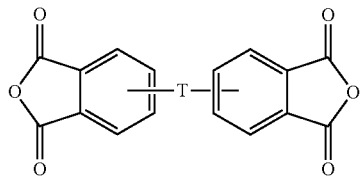

and the organic diamine represented by the above structural formula:

T, R, n, m and g in the above structural formula are the same as defined above.

The poly(etherimide-siloxane) copolymer may be any of a random copolymer, an alternating copolymer and a block copolymer and, of these copolymers, a block copolymer is preferable since it is flexible and exhibits excellent toughness. Examples of the poly(etherimide-siloxane)block copolymer include a chemical structure represented by the following structural formula:

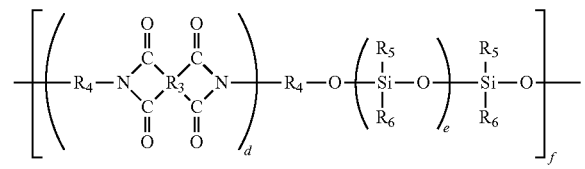

wherein f in the structural formula is an integer of 1 to 10,000, d is an integer of 1 to 50, e is an integer of 2 to 40, and $R_3$ is a tetravalent aromatic group and is selected from the following formulas.

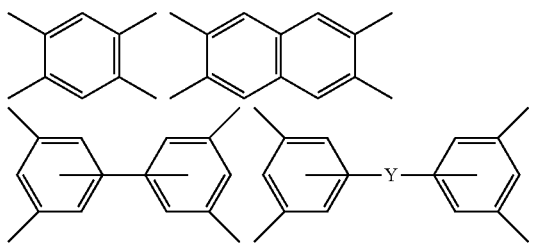

Y in the above formula is a divalent group selected from a $C_{1-5}$ alkylene group or halogenated derivatives thereof, —CO—, —SO$_2$—, —O—, —S—, and —O—Z—O—. Z is the same as above.

$R_4$ is the same as R defined above.

$R_5$ and $R_6$ are each independently selected from a $C_{1-8}$ alkyl group, halogen-substituted products or nitrile-substituted products thereof, and a $C_{6-13}$ aryl group.

Examples of the method of producing a poly(etherimide-siloxane)block copolymer include a known method in which a hydroxyl group-terminated polyimide oligomer of the following formula:

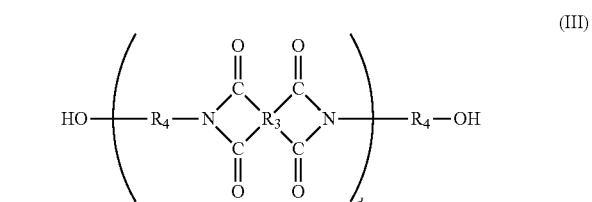

with a siloxane oligomer of the following formula:

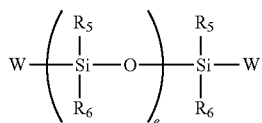

under etherification conditions.

In the above formula, d, e and $R_3$ to $R_6$ are as defined above. W in the above formula is a group selected from halogen, a dialkylamino group, an acyl group and an alkoxy group which can be substituted by a reaction with a hydroxyl group in the hydroxyl group-terminated polyetherimide oligomer of structural formula (III) to form an ether bond.

The poly(etherimide-siloxane)block copolymer can also be synthesized by sequentially adding a reactant in a known method in which polyetherimide is produced from an aromatic bis(ether anhydride) and an organic diamine.

The glass transition temperature of the poly(etherimide-siloxane) copolymer is not particularly limited, and is preferably 140° C. or higher and 220° C. or lower, more preferably 150° C. or higher and 210° C. or lower, and still more preferably 160° C. or higher and 200° C. or lower, from the viewpoint of the heat resistance and flexibility.

The polyetherimide resin is preferably mixed in the amount of 1 to 50 parts by weight based on 100 parts by weight of the PPS resin. By setting the mixing amount at 50 parts by weight or less, the chemical resistance inherent in PPS is not impaired, which is also preferable from the viewpoint of molding. The mixing amount is more preferably 3 parts by weight or more, and still more preferably 5 parts by weight or more. The mixing amount is more preferably 30 parts by weight or less, still more preferably 20 parts by weight or less, and most preferably 15 parts by weight or less.

(f) Polyethersulfone Resin

The polyethersulfone resin is a general term for a polymer having a skeleton in which an aromatic group is bonded by a sulfone group and an ether group. Examples thereof include polyethersulfone composed of at least one repeating unit selected from the group consisting of general formulas (1) to (3).

$$(-Ar^1-SO_2-Ar^2-O-) \quad (1)$$

$$(-Ar^3-V-Ar^4-O-Ar^5-SO_2-Ar^6-O-) \quad (2)$$

$$(-Ar^7-SO_2-Ar^8-O-Ar^9-O-) \quad (3)$$

In formula (1), $Ar^1$ and $Ar^2$ are the same or different aromatic hydrocarbon group having 6 to 12 carbon atoms. In formula (2), $Ar^3$ to $Ar^6$ are the same or different aromatic hydrocarbon group having 6 to 12 carbon atoms, and V is a divalent hydrocarbon group having 1 to 15 carbon atoms. In formula (3), $Ar^7$ to $Ar^9$ are the same or different aromatic hydrocarbon group having 6 to 12 carbon atoms.

In formula (1), $Ar^1$ and $Ar^2$ are suitably arylene groups having 6 to 12 carbon atoms, and more suitably arylene groups having 6 to 10 carbon atoms. Specific examples thereof include a m-phenylene group, a p-phenylene group, a dimethyl-p-phenylene group, a tetramethyl-p-phenylene group, a naphthalene group, a biphenylylene group and the like. When both $Ar^1$ and $Ar^2$ are p-phenylene groups is advantageous from the viewpoint of production and is particularly suitably used.

In formula (2), $Ar^3$ to $Ar^6$ are suitably arylene groups having 6 to 12 carbon atoms, and more suitably arylene groups having 6 to 10 carbon atoms. Specific examples thereof include a m-phenylene group, a p-phenylene group, a dimethyl-p-phenylene group, a tetramethyl-p-phenylene group, a naphthalene group, a biphenylylene group and the like. Particularly suitably, both $Ar^3$ to $Ar^6$ are p-phenylene groups. V is a divalent hydrocarbon group having 1 to 15 carbon atoms and is preferably a group selected from an aliphatic hydrocarbon group, an alicyclic hydrocarbon group and an aralkylene group. It is suitably a group selected from a divalent aliphatic hydrocarbon group having 1 to 10 carbon atoms, an alicyclic hydrocarbon group and an aralkylene group. Specific examples thereof include aliphatic hydrocarbon groups such as a methylene group, a 1,1-ethylene group, a 2,2-propylene group, a 2,2-butylene group and a 4-methyl-2,2-pentylene group; alicyclic hydrocarbon groups such as a 1,1-cyclohexylene group and a 3,3,5-trimethyl-1,1-cyclohexylene group; and aralkylene groups such as a 1-phenyl-1,1-ethylene group and a diphenylmethylene group. Of these groups, a 2,2-propylene group is more suitably used. In formula (2), it is particularly preferable that both $Ar^3$ to $Ar^6$ are p-phenylene groups and V is a 2,2-propylene group.

In formula (3), $Ar^7$ and $Ar^8$ are suitably arylene groups having 6 to 12 carbon atoms, and more suitably arylene groups having 6 to 10 carbon atoms. Specific examples thereof include a m-phenylene group, a p-phenylene group, a dimethyl-p-phenylene group, a tetramethyl-p-phenylene group, a naphthalene group, a biphenylylene group and the like. Of these groups, a p-phenylene group is more suitably used as both $Ar^7$ and $Ar^8$. $Ar^9$ is suitably an arylene group having 6 to 12 carbon atoms, and more suitably an arylene group having 6 to 10 carbon atoms. Specific examples thereof include a m-phenylene group, a p-phenylene group, a naphthalene group, a biphenylylene group and the like. Of these groups, a p-phenylene group or a biphenylylene group is still more suitable. In formula (3), particularly preferably, all of $Ar^7$, $Ar^8$ and $Ar^9$ are p-phenylene groups.

The above polyethersulfone can be polymerized by a known method. For example, it can be obtained by polycondensing a monomer having a hydroxyl group and a halogen group at the end in an aprotic polar solvent in the presence of an alkali metal carbonate.

The polyethersulfone resin is preferably mixed in the amount of 1 to 50 parts by weight based on 100 parts by weight of the PPS resin. By setting the mixing amount at 50 parts by weight or less, the chemical resistance inherent in PPS is not impaired, which is also preferable from the viewpoint of molding. The mixing amount is more preferably 3 parts by weight or more, and still more preferably 5 parts by weight or more. The mixing amount is more preferably 30 parts by weight or less, still more preferably 20 parts by weight or less, and most preferably 15 parts by weight or less.

It is possible to use, as the polyethersulfone resin, those which are commercially available from Solvay Advanced Polymers under the trade name of "Radel (registered trademark)", those which are commercially available from BASF Corporation under the trade name of "Ultrazone (registered trademark)", and those which are commercially available from Sumitomo Chemical Company, Limited under the trade name of "SUMIKAEXCEL (registered trademark)."

(g) Fluororesin

The fluororesin is not particularly limited, and examples thereof are preferably those in which a reactive functional group is introduced. The reactive functional group is not particularly limited, and specific examples thereof include a vinyl group, an epoxy group, a carboxyl group, an acid anhydride group, an ester group, an aldehyde group, a carbonyldioxy group, a haloformyl group, an alkoxycarbonyl group, an amino group, a hydroxyl group, a styryl group, a methacrylic group, an acrylic group, an ureido group, a mercapto group, a sulfide group, an isocyanate group, a hydrolyzable silyl group and the like. Of these groups, an epoxy group, a carboxyl group, an acid anhydride group, an amino group and a hydroxyl group are preferable, and a carboxyl group and an acid anhydride group are more preferable. Two or more of these reactive functional groups may be contained.

Examples of the method of introducing a reactive functional group into a fluororesin include a method of mixing a compound or resin compatible with a fluororesin and has the above functional group, a method of copolymerizing with a polymerizable monomer having the functional group or having a functional group capable of being converted into the above functional group in polymerizing a fluororesin, a method using an initiator having the functional group or having a functional group capable of being converted into the above functional group in polymerizing a fluororesin, a method of reacting a fluororesin with a polymerizable monomer having the functional group or having a functional group capable of being converted into the above functional group in the presence of a radical generator, a method of modifying a fluororesin by a technique such as oxidation or thermal decomposition and the like. Of these methods, a method of introducing a functional group into the main chain, the side chain or the end of a fluororesin by copolymerization, or a method of reacting a fluororesin with a polymerizable monomer having a functional group in the presence of a radical generator is preferable from the viewpoint of the quality, cost and control of the introducing amount.

The polymerizable monomer having a functional group is not particularly limited, and examples thereof include acrylic acid, methacrylic acid, maleic acid, itaconic acid, citraconic acid, crotonic acid, himic acid, and acid anhydrides thereof; glycidyl acrylate, glycidyl methacrylate, glycidyl ethylacrylate, glycidyl itaconate, vinyl acetate, vinyl propionate, vinyltrimethoxysilane, vinyltriethoxysilane, γ-methacryloxypropyltrimethoxysilane and the like.

The structure of the fluororesin is not particularly limited, and it is desirable to use at least one fluoroolefin as a monomer. Examples thereof include homopolymers such as tetrafluoroethylene or chlorotrifluoroethylene, and copolymers of these monomers with hexafluoropropylene, perfluoro(alkyl vinyl ether), vinylidene fluoride and vinyl fluoride. Examples thereof further include copolymers of these monomers with a non-fluorinated ethylenic monomer containing no fluorine, such as ethylene, propylene, butene and alkyl vinyl ethers. Specific examples thereof include polytetrafluoroethylene (PTFE), ethylene-tetrafluoroethylene copolymer (ETFE), tetrafluoroethylene-perfluoro(alkyl vinyl ether) copolymer (PFA), tetrafluoroethylene-hexafluoropropylene copolymer (FEP), ethylene-tetrafluoroethylenehexafluoropyrene copolymer (EFEP), polyvinylidene fluoride (PVDF), polychlorotrifluoroethylene (PCTFE) and the like. Of these, ethylene-tetrafluoroethylene copolymer (ETFE), tetrafluoroethylene-perfluoro(alkyl vinyl ether) copolymer (PFA), tetrafluoroethylene-hexafluoropropylene copolymer (FEP) and the like are preferable and ETFE is more preferable from the viewpoint of high heat resistance and easy melt molding.

The melt viscosity of the fluororesin is not particularly limited, and is preferably 100 Pa·s or more and 10,000 Pa·s or less when measured at a temperature of a melting point+100° C. from the view point of enhancing the miscibility by reducing the viscosity difference with the PPS resin.

The melting point of the fluororesin is not particularly limited, and is preferably 130° C. or higher and 330° C. or lower. From the viewpoint of the heat resistance, the melting point is more preferably 150° C. or higher and 310° C. or lower, still more preferably 180° C. or higher and 300° C. or lower, yet more preferably 200° C. or higher and 280° C. or lower, and most preferably 210° C. or higher and 260° C. or lower. It is also possible to use a fluororesin having a reactive functional group in combination with a fluororesin having no reactive functional group.

The fluororesin is preferably mixed in the amount of 1 to 50 parts by weight based on 100 parts by weight of the PPS resin. By setting the mixing amount at 50 parts by weight or less, the chemical resistance inherent in PPS is not impaired, which is also preferable from the viewpoint of molding. The mixing amount is more preferably 3 parts by weight or more, and still more preferably 5 parts by weight or more. The mixing amount is more preferably 30 parts by weight or less, still more preferably 20 parts by weight or less, and most preferably 15 parts by weight or less.

(h) Method of Producing PPS Resin Composition

It is possible to use, as a method of producing a PPS resin composition, a method in which raw materials including a polyphenylene sulfide resin, an organosilane compound and a metal salt of phosphorus oxoacid are mixed in a molten state or a solution state. From the viewpoint of simplicity, production in a molten state can be preferably used. It is possible to use, as the method of mixing raw materials in a molten state, melt-kneading using an extruder, melt-kneading method using a kneader or the like. From the viewpoint of the productivity, melt-kneading using an extruder, capable of continuously producing can be preferably used. It is possible to use, as the extruder used for melt-kneading, one or more extruders, for example, a single-screw extruder, a multi-screw extruder such as a twin-screw extruder or a quad-screw extruder, and a twin-screw/single-screw composite extruder. From the viewpoint of improving the kneadability, reactivity and productivity, a multi-screw extruder such as a twin-screw extruder or a quad-screw extruder can be preferably used, and a twin-screw extruder can be most preferably used.

Examples of more specific methods of producing a PPS resin composition include a method in which a mixture of a PPS resin and a metal salt of phosphorus oxoacid is produced in advance and then other components are mixed, and a method in which a PPS resin, an organosilane compound, a metal salt of phosphorus oxoacid and other components are mixed at a time. From the viewpoint of efficiently producing a resin composition, typical examples include a method in which a PPS resin, an organosilane compound, a metal salt of phosphorus oxoacid and other components are fed in a twin-screw extruder and then melt-kneaded at a processing temperature in a range of a melting point of a PPS resin+5 to 100° C. To react a PPS resin with an organosilane compound by melt-kneading, there is a need to comparatively increase a shear force. Therefore, in the screw arrangement of a twin-screw extruder, the twin-screw extruder is preferably provided with two or more kneading sections, more preferably three or more kneading sections, and still more preferably five or more kneading sections. The upper limit of the number of kneading sections can vary depending on the length of each kneading section and the distance between kneading sections, and is preferably 10 or less, and more preferably 8 or less. A ratio of the total length of kneading sections to the total screw length of the extruder is preferably in a range of 10 to 60%, more preferably 15 to 55%, and still more preferably 20 to 50%.

L/D, which is a ratio of the screw length L to the screw diameter D of the twin-screw extruder, is preferably 10 or more, more preferably 20 or more and, and still more preferably 30 or more. The upper limit of L/D of the twin-screw extruder is usually 60. The circumferential speed selected in this example is 15 to 50 m/min, and more preferably 20 to 40 m/min. It is not preferable that the L/D of the twin-screw extruder is less than 10 since the PPS resin and the organic silane compound may not react sufficiently because of insufficient kneading section.

It is possible to exemplify, as more preferable screw arrangement, inclusion of a stirring screw with cutouts. The "cutout" as used herein means the section formed by partly cutting out crests of a screw flight. The stirring screw with cutouts can increase the resin filling ratio, and suppresses the decomposition of the resin due to heat generation, thus enabling kneading mainly with stirring and agitation, unlike a conventional kneading technique of grinding the resin. Therefore, by performing melt kneading using the screw arrangement including a stirring screw with cutouts, the PPS resin and the organic silane compound can be sufficiently reacted, which is preferable.

The stirring screw with cutouts is preferably a stirring screw with cutouts in which the length of the screw pitch is 0.1 D to 0.3 D and the number of cutouts is 10 to 15 per one pitch when the screw diameter is D, from the viewpoint of improving cooling efficiency of the molten resin due to resin filling and improving the stirring kneadability. The length of the screw pitch refers to the screw length between crests of the screw when the screw rotates 360 degrees.

When using a screw arrangement with cutouts, a ratio of the total length of the stirring screw with cutouts to the total screw length of the extruder is preferably 3 to 20%, and more preferably 5 to 15%, of the total screw length.

The screw rotational speed is preferably 150 rpm or more, and more preferably 200 rpm or more, from the viewpoint of sufficiently reacting the PPS resin and the organic silane compound. The upper limit of the screw rotational speed is not particularly limited, and is preferably 1,500 rpm or less from the viewpoint of reducing the load on the extruder.

The mixing order of the raw materials is not particularly limited, and it is possible to use any method, for example, a method in which all raw materials are mixed and then melt-kneaded by the above method, a method in which raw materials are partially melt-kneaded by the above method and the kneaded mixture and the remaining raw materials are mixed and melt-kneaded, and a method in which the remaining raw materials are mixed using a side feeder while partially melt-kneading the raw materials with a twin-screw extruder.

(i) Feature of PPS Resin Composition

Regarding the PPS resin composition, by mixing a PPS resin with each specific amount of an organosilane compound and a metal salt of phosphorus oxoacid, initial toughness typified by a tensile elongation at break and toughness after a high-temperature heat treatment typified by a tensile elongation at break after a dry heat treatment have been improved without impairing physical properties such as excellent mechanical strength, chemical resistance, electrical insulation properties and moldability possessed inherently by the PPS resin.

The tensile elongation at break as used herein refers to a tensile elongation at break measured by Tensilon UTA 2.5 T Tensile Tester according to ASTM-D638 under the conditions of a distance between supporting points of 64 mm, a tensile speed of 10 mm/min, an ambient temperature of 23° C. and a relative humidity of 50% using each of ASTM No. 4 dumbbell test pieces obtained by injection molding of a PPS resin composition. The tensile elongation at break is preferably 20% or more, more preferably 30% or more, and still more preferably 40% or more. The upper limit of the tensile elongation at break is not particularly limited, and is generally 200% or less. It is not preferable that the tensile elongation at break is less than 20% since cracking may occur when forming an extrusion molded article or an injection molded article or a production problem such as breakage may occur when assembling as a component. Therefore, the mixing amount of the inorganic filler is preferably less than 5 parts by weight, more preferably less than 1 part by weight, based on 100 parts by weight of the PPS resin, and still more preferably, the inorganic filler is not substantially mixed. Specific examples of the inorganic filler include glass fibers, carbon fibers, potassium titanate whiskers, zinc oxide whiskers, calcium carbonate whiskers, wollastonite whiskers, aluminum borate whiskers, alumina fibers, silicon carbide fibers, ceramic fibers, asbestos fibers, Gypsum fibers, wollastonite, zeolite, sericite, mica, kaolin, clay, talc, pyrophyllite, bentonite, asbestos, alumina silicate, silicon oxide, magnesium oxide, alumina, zirconium oxide, titanium oxide, calcium carbonate, magnesium carbonate, Dolomite, calcium sulfate, barium sulfate, calcium hydroxide, magnesium hydroxide, glass beads, glass flakes, glass powder, ceramic beads, boron nitride, silicon carbide, carbon Rack, silica, graphite and the like.

The tensile elongation at break after a dry heat treatment as used herein refers to a tensile elongation at break measured by Tensilon UTA 2.5 T Tensile Tester according to ASTM-D638 under the conditions of a distance between supporting points of 64 mm, a tensile speed of 10 mm/min, an ambient temperature of 23° C. and a relative humidity of 50% using each of ASTM No. 4 dumbbell obtained by injection molding of a PPS resin composition and subjecting to a treatment in the air at 200° C. for 500 hours. By using the composition, it is possible to adjust the tensile elongation at break after a dry heat treatment of a molded article to 10% or more. In a preferred example, it is possible to adjust the tensile elongation at break after subjecting the molded article to a treatment in the air at 200° C. for 500 hours to 15% or more and 18% or more. A composition having a tensile elongation at break after a dry heat treatment of a molded article of 10% or more may not become brittle even when used for applications requiring the heat resistance, and can be preferably used for such applications. In particular, if the tensile elongation at break after a dry heat treatment is 15% or more, the composition can be employed for in-vehicle members around the engine of hybrid vehicles, steering-related members, shape retention members and the like. If the tensile elongation at break after a dry heat treatment is 18% or more, the composition can be employed for in-vehicle members such as peripheral members of the engine or motor of high-power hybrid vehicles required to have the highest heat resistance and motor peripheral members of electric vehicles, steering-related members, shape retention members and the like. If the tensile elongation at break after a dry heat treatment is less than 10%, the brittle fracture tends to occur without reaching the yield point strength, thus causing a practical problem.

By further mixing the PPS resin composition with at least one resin selected from a polyetherimide resin, a polyethersulfone resin and a fluororesin, it is possible to improve a tensile elongation at break after a long-term dry heat treatment when forming a molded article.

The tensile elongation at break after a long-term dry heat treatment as used herein refers to a tensile elongation at break measured by Tensilon UTA 2.5 T Tensile Tester according to ASTM-D638 under the conditions of a distance between supporting points of 64 mm, a tensile speed of 10 mm/min, an ambient temperature of 23° C. and a relative humidity of 50% using each of ASTM No. 4 dumbbell obtained by injection molding of a PPS resin composition and subjecting to a treatment in the air at 200° C. for 700 hours. This tensile elongation at break after a long-term dry heat treatment is preferably 8% or more, more preferably 10% or more, and still more preferably 15% or more. If the tensile elongation at break after a long-term dry heat treatment is 15% or more, the composition can be applied to members used in high-temperature environment as aerospace applications and in-vehicle applications. If the tensile elongation at break after a long-term dry heat treatment is less than 8%, the brittle fracture tends to occur without reaching the yield point strength, thus causing a practical problem.

As a result of sufficient reaction between the PPS resin and the organosilane compound, it was possible to improve a stress retention rate determined from a stress-strain curve obtained in the tensile test, and to improve initial toughness typified by a tensile elongation at break and toughness after a high-temperature heat treatment typified by a tensile elongation at break after a dry heat treatment. The stress retention rate as used herein is a value determined from the stress-strain curve measured by Tensilon UTA 2.5 T Tensile Tester according to ASTM-D638 under the conditions of a distance between supporting points of 64 mm, a tensile speed of 10 mm/min, an ambient temperature of 23° C. and a relative humidity of 50% using each of ASTM No. 4 dumbbell test pieces obtained by injection molding of a PPS resin composition, the value being defined by the following equation:

$$\text{Stress retention rate} = (\text{stress at lower yield point (MPa)})/(\text{stress at upper yield point (MPa)}) \times 100\ (\%).$$

An upper yield point is a point at which the stress in the elastic deformation area is maximum. Meanwhile, a lower yield point is a point at which the stress in the plastic deformation area starts to change at a constant value. The elastic deformation area is the area until the stress first decreases from the start of the test in the stress-strain curve. The plastic deformation area is the entire area excluding the elastic deformation area in the stress-strain curve. When a plurality of lower yield points exist, the lower yield point with maximum tensile strain is employed.

The lower the stress retention rate becomes, the lower the initial toughness and the tensile elongation at break after a dry heat treatment. The higher the stress retention rate becomes, the higher the initial toughness and the tensile elongation at break after a dry heat treatment. By using the PPS resin composition, it is possible to adjust the stress retention rate to 92% or more. In a further preferred example, it is possible to adjust the stress retention rate to 95% or more, and more preferably 98% or more. In the most preferred example, it is also possible to adjust to 100% or more. It is not preferable that the stress retention rate of the PPS resin composition is less than 88% since the PPS resin and the organic silane compound do not react sufficiently, and thus the tensile elongation at break after a dry heat treatment decreases. The upper limit of the stress retention rate is not particularly limited, and is usually 150% or less.

Although the mechanism by which the PPS resin composition is excellent in tensile elongation at break after a long-term dry heat treatment is not clear, it is presumed that a melt viscosity ratio before and after the long-term dry heat treatment determined by the following equation due to the entanglement of molecular chains formed by the reaction, the network structure and crosslinked structure:

Melt viscosity ratio before and after long-term dry heat treatment=(melt viscosity after subjecting to treatment at 200° C. for 700 hours (Pa·s))/ (melt viscosity before subjecting to long-term dry heat treatment (Pa·s))×100(%).

The melt viscosity after subjecting to a treatment at 200° C. for 700 hours is a melt viscosity determined by Capirograph using each of ASTM No. 4 dumbbell obtained by injection molding of a PPS resin composition, subjecting to a treatment in the air at 200° C. for 700 hours and then cut into small pieces. The melt viscosity ratio before and after a long-term dry heat treatment is preferably 150 or less, more preferably 145 or less, and still more preferably 140 or less. It is not preferable that the melt viscosity ratio before and after a long-term dry heat treatment exceeds 160 since it means that oxidative deterioration is progressed by a heat treatment, leading to a decrease in tensile elongation at break. It is not preferable that the melt viscosity ratio before and after a long-term dry heat treatment is less than 80 since the polymer may be decomposed by a heat treatment.

As a result of sufficient reaction between the PPS resin and the organosilane compound, the value of a non-Newtonian index of the PPS resin composition falls within a specific range, thus making it possible to improve initial toughness typified by a tensile elongation at break and toughness after a high-temperature heat treatment typified by a tensile elongation at break after a dry heat treatment. The non-Newtonian index n is obtained by measuring the shear stress of the PPS resin composition at a temperature of 300° C. and a shear rate of 60/sec to 3,060/sec using Capilograph, followed by calculation from the results using the following equation.

$$SR = k \cdot SS^n$$

SR: shear rate
SS: shear stress
k: viscosity coefficient
n: non-Newtonian index.

The non-Newtonian index is preferably 1.8 to 2.5, and more preferably 1.9 to 2.3. It is not preferable that the non-Newtonian index is less than 1.8 since the PPS and the organosilane compound do not react sufficiently, and thus the initial toughness typified by the tensile elongation at break deteriorates. It is not preferable that the non-Newtonian index exceeds 2.5 since the PPS and the organosilane compound form a strong network structure to form a gel, and thus the moldability significantly deteriorates.

To obtain a composition making use of properties of the PPS resin composition, it is preferable to further mix the PPS resin composition with at least one resin selected from a polyetherimide resin, a polyethersulfone resin and a fluororesin. In that example, for the obtained resin composition to exhibit excellent toughness and high-temperature long-term durability, there is a need for the PPS resin of a resin phase separation structure observed by an electron microscope of the PPS resin composition to form a continuous phase (sea phase or matrix) and to form a dispersed phase (island phase) in which at least one resin selected from a polyetherimide resin, a polyether sulfone resin and a fluororesin is dispersed in the sea phase with a number average dispersion particle diameter of 1,000 nm or less. The number average dispersion particle diameter of the island phase is more preferably 500 nm or less, and still more preferably 300 nm or less.

By forming the above resin phase separation structure, it is possible to exhibit excellent initial toughness and toughness after a high-temperature long-term durability treatment possessed inherently by the PPS resin without impairing excellent heat resistance and chemical resistance, thus making it possible to apply to members for coating electric wires and plastic fasteners.

The number average dispersion particle diameter of the island phase falling in the above range means satisfactory compatibility between the PPS resin and at least one resin selected from a polyetherimide resin, a polyethersulfone resin and a fluororesin, leading to the development of excellent toughness.

It is not preferable that the number average dispersion particle diameter of the island phase exceeds 1,000 nm since inferior adhesion of a resin interface may cause appearance defect of the molded product, thus making it difficult to apply to covering members for thin electric wires and plastic fasteners. It is not preferable that the number average dispersion particle diameter of the island phase is less than 1 nm since it is close to a completely compatible state and thus excellent toughness may be impaired.

The number average dispersion particle diameter of the island phase is calculated by the following method. Pellets of the PPS resin composition are cut to cut out thin pieces having a size of 0.1 μm or less, which are photographed using a transmission electron microscope at a magnification of about 1,000 to 5,000 times. From the thus obtained photographs, first, a maximum diameter and a minimum diameter of each dispersed phase are measured for any 100 dispersed phases, and an average of the maximum diameter and the minimum diameter of each dispersed phase is regarded as a diameter of each dispersed phase. A value obtained by number-averaging the diameters of 100 dispersed phases is regarded as a number average dispersed diameter of the island phase.

(j) Applications of PPS Resin Composition

The polyphenylene sulfide resin composition can be molded by various molding techniques such as injection molding, extrusion molding, compression molding, blow molding and injection compression molding, and is useful for injection molding applications. In particular, because of excellent tensile elongation at break after a dry heat treatment, the polyphenylene sulfide resin composition is particularly suitable for aerospace applications and in-vehicle applications. The polyphenylene sulfide resin composition is extremely excellent in tensile elongation at break and excellent in toughness after a long-term high-temperature heat treatment, and is also useful for extrusion molding applications which require relatively high molding temperature and long melting retention time. In particular, the polyphenylene sulfide resin composition is advantageous for thin-walled molded products requiring a uniform thickness because of its high stress retention rate, and is also suitable for members used on the premise of receiving an external force intermittently or over a long period, especially transmission members such as steering device members, shape retention members such as plastic fasteners and the like. The polyphenylene sulfide resin composition is also useful for blow molding application because of its excellent properties such as melt tension and elongation viscosity. Specific examples of blow molding include extrusion blow, injection blow, sheet blow, and multi-dimensional blow such as three-dimensional blow and suction blow. From the viewpoint of compositely imparting various properties, it is also suitable to perform multilayer blowing of two kinds of two layers, three kinds of three layers, two kinds of five layers and the like.

Examples of applications of the molded article obtained by injection molding include electric device parts such as generators, motors, voltage transformers, current transformers, voltage regulators, rectifiers, inverters, relays, power contacts, switches, breakers, knife switches, multipole rods and electric component cabinets; electronic components such as sensors, LED lamps, connectors, sockets, resistors, relay cases, switches, coil bobbins, capacitors, variable capacitor cases, optical pickups, oscillators, various terminal boards, transformers, plugs, printed circuit boards, tuners, speakers, microphones, headphones, small motors, magnetic head bases, power modules, semiconductors, liquid crystals, FDD carriages, FDD chasses, motor brush holders, parabola antennas, and computer-related components; VTR components, TV set components, irons, hair dryers, rice cooker components, microwave oven components, acoustic equipment components such as acoustic components, audio-laser discs, and compact discs; domestic and office electric appliance components such as lighting components, refrigerator components, air conditioner components, typewriter components, and word processor components; machine-related components such as office computer-related components, telephone-related components, facsimile-related components, copy machine-related components, cleaning jigs, motor components, lighters and typewriters; optical equipment and precision machine components, such as microscopes, binoculars, cameras and watches; automobile and vehicle-related components such as alternator terminals, alternator connectors, IC regulators, potentiometer bases for light dimmers, various valves including emission valves, various pipes and ducts for fuel, exhaust system, and air intake system, turbo ducts, air intake nozzle snorkels, intake manifolds, fuel pumps, engine coolant joints, carburetor main bodies, carburetor spacers, emission sensors, coolant sensors, oil temperature sensors, brake pad wear sensors, throttle position sensors, crankshaft position sensors, air flowmeters, brake pad wear sensors, thermostat bases for air conditioners, hot air flow control valves, brush holders for radiator motors, water pump impellers, turbine vanes, wiper motor-related components, distributors, starter switches, starter relays, transmission wire harnesses, windshield washer fluid nozzles, air conditioner panel switch plates, fuel solenoid valve coils, fuse connectors, horn terminals, electric component insulators, step motor rotors, lamp sockets, lamp reflectors, lamp housings, brake pistons, solenoid bobbins, engine oil filters, crush pads, Insulok, cable ties and ignition device cases; and gaskets for primary batteries and secondary batteries of cell phones, smartphones, laptop computers, tablet type personal computers, video cameras, hybrid vehicles and electric vehicles.

Examples of the molded article obtained by extrusion molding include round bars, square bars, sheets, films, tubes, pipes and the like. Specific applications include electrical insulating materials such as water heater motors, air-conditioner motors and drive motors, film capacitors, speaker diaphragms, recording magnetic tapes, printed board materials, printed board peripherals, seamless belts, semiconductor packages, trays for conveying semiconductors, process/release films, protective films, film sensors for automobiles, insulating tapes for wire cables, insulating washers in lithium ion batteries, tubes for hot water, cooling water, and chemicals, fuel tubes for automobiles, pipes for hot water, pipes for chemicals in chemical plants, pipes for ultrapure water and ultrapure solvents, pipes for automobiles, pipes for chlorofluorocarbons and supercritical carbon dioxide refrigerants, and workpiece-holding rings for polishers. Other examples include molded articles for coating motor coil wires in hybrid vehicles, electric vehicles, railways, and power plants; and molded articles for coating heat-resistant electric wires and cables for household electrical appliances, wire harnesses and control wires such as flat cables used for the wiring in automobiles, and winding wires of signal transformers and car-mounted transformers for communication, transmission, high frequencies, audios, and measurements.

Examples of applications of the molded article obtained by blow molding include fuel tanks for automobiles, oil tanks, resonators, intercoolers, intake manifolds, turbo ducts, air intake and exhaust ducts, radiator pipes, radiator headers, expansion tanks, oil circulation pipes and the like.

Of the above-mentioned molded articles, particularly useful molded articles are in-vehicle members exposed to high-temperature environment, for example, fuel-related various pipes and ducts for air intake and exhaust system, motor peripheral members and power transmission members of hybrid vehicles and electric vehicles, railways and power generation equipment, especially steering gears and members for coating electric wires, in-vehicle cable ties and the like.

These various molded articles can also be subjected to second processing such as hot plate welding, laser welding, induction heating welding, high frequency welding, spin welding, vibration welding, ultrasonic welding, and injection welding.

EXAMPLES

Our compositions, molded articles and methods will be more specifically described by way of Examples, but this disclosure is not limited only thereto.

In the following examples, material properties were evaluated by the following methods.

Number Average Molecular Weight

The number average molecular weight (Mn) of the PPS resin was measured using gel permeation chromatography (GPC) manufactured by Senshu Scientific Co., Ltd. under the following conditions, and calculated in terms of polystyrene.

Apparatus: SSC-7100 (Senshou Scientific)
Column name: GPC3506 (Sensshu Scientific)
Eluent: 1-chloronaphthalene
Detector: Differential refractive index detector
Column temperature: 210° C.
Pre-isothermal chamber temperature: 250° C.
Pump-isothermal chamber temperature: 50° C.
Detector temperature: 210° C.
Flow rate: 1.0 mL/min
Sample injection amount: 300 μL (Slurry-like: about 0.2% by weight).

Non-Newtonian Index

Using Capilograph 1B manufactured by Toyo Seiki Seisaku-sho, Ltd. (capillary having a length of 10 mm and a diameter of 1 mm), a shear stress of 60/sec to 3060/sec was measured at a temperature of 300° C. From the results, the non-Newtonian index n was calculated using the following equation:

$$SR = k \cdot SS^n$$

SR: shear rate
SS: shear stress
k: viscosity coefficient
n: non-Newtonian index.

Melt Viscosity

Using Capilograph 1B manufactured by Toyo Seiki Seisaku-sho, Ltd. (capillary having a length of 10 mm and a diameter of 1 mm), a melt viscosity (Pa·s) was measured under the conditions of 300° C. and a shear rate of 1,000/sec.

Injection Molding

Using an injection molding machine SE75-DUZ manufactured by Sumitomo Heavy Industries, Ltd., each of ASTM No. 4 dumbbell test pieces was molded under the conditions of a resin temperature of 300° C. and a mold temperature of 150° C.

Dry Heat Treatment

Each of ASTM No. 4 dumbbell test pieces obtained by the above injection molding was placed in a Geer oven set at 200° C., subjected to a treatment for 500 hours or 700 hours and then allowed to cool at room temperature for 24 hours or more.

Melt Viscosity Ratio Before and after Long-Term Dry Heat Treatment

Using Capilograph 1B manufactured by Toyo Seiki Seisaku-sho, Ltd. (capillary having a length of 10 mm and a diameter of 1 mm), a melt viscosity (Pa·s) before a long-term dry heat treatment of each of pellets obtained by melt-kneading was measured under the conditions of 300° C. and a shear rate of 1,000/sec. Subsequently, each ASTM No. 4 dumbbell subjected to a treatment for 700 hours by the above method was cut into small pieces. Using Capilograph 1B manufactured by Toyo Seiki Seisaku-sho, Ltd. (capillary having a length of 10 mm and a diameter of 1 mm), a melt viscosity (Pa·s) was measured under the conditions of 300° C. and a shear rate of 1,000/sec to determine a melt viscosity subjected to a treatment at 200° C. for 700 hours. Subsequently, a melt viscosity ratio before and after a long-term dry heat treatment was calculated in accordance with the following formula:

Melt viscosity ratio before and after long-term dry
   heat treatment=(melt viscosity after subjecting
   to treatment at 200° C. for 700 hours (Pa·s))/
   (melt viscosity before subjecting to long-term
   dry heat treatment (Pa·s))×100(%).

Tensile Test

Using Tensilon UTA2.5T tensile tester, a tensile elongation at break of each of ASTM No. 4 dumbbell test pieces (thickness of 1.6 mm) was measured according to ASTM-D638 under the conditions of a distance between supporting points of 64 mm, a tensile speed of 10 mm/min, an ambient temperature of 23° C. and a relative humidity of 50%, and then an average in five times of measurement was determined.

Stress Retention Rate

A stress retention rate defined by the following formula was determined from a stress-strain curve obtained by the tensile test, and then an average in five times of measurement was determined.

Stress retention rate=(stress at lower yield point
   (MPa))/(stress at upper yield point (MPa))×100
   (%).

Evaluation of High-Temperature Long-Term Durability of Members for Coating Electric Wires Each of pellets obtained in each of the Examples and Comparative Examples is dried at 130° C. for 8 hours. Using an electric wire coating apparatus manufactured by MITSUBA MFG. CO., LTD. A polyphenylene sulfide resin composition was extrusion-coated on a rectangular copper wire to obtain a flat electric wire (a: 70 μm, b: 3 mm, c: 4 mm) in which the rectangular copper wire 5 is coated with a coating resin 6 as shown in FIG. 2. Subsequently, the flat electric wire thus obtained was cut to obtain ten electric wires having a length of 50 cm. After subjecting to a treatment in the atmosphere of 200° C. for 1,000 hours (high-temperature long-term endurance treatment), the flat electric wire was allowed to cool at normal temperature for 24 hours. The electric wire was visually confirmed and an average of the number of cracks per 50 cm of one electric wire was regarded as an index of high-temperature long-term durability as the number of cracks after subjecting to a treatment at 200° C. for 1,000 hours. The smaller the number of cracks, the better the high-temperature long-term heat resistance.

Evaluation of Properties of Molded Plastic Fastener Article
Evaluation of Cracks in Plastic Fastener when Fitted while Installing Wiring (Initial Toughness)

Pellets obtained in the respective Examples and Comparative Examples were dried at 130° C. for 8 hours and then injection-molded at a cylinder temperature of 320° C. and a mold temperature of 150° C. using an injection molding machine (SE75DUZ-C250) manufactured by Sumitomo Heavy Industries Ltd. to obtain 30 molded plastic fastener articles shown in FIG. 1 (W1: 15 mm, W2: 20 mm, W3: 5.0 mm, H1: 2 mm, and H2: 8.5 mm). In FIG. 1, (A) shows a cross-sectional view of the plastic fastener before fitting, and (B) shows a cross-sectional view of the plastic fastener when fitted. (D) shows a top view of the plastic fastener when fitted, and (E) shows a side view thereof. As shown in FIG. 1(C), the obtained molded plastic fastener article was used to fix a cable 4 having a diameter of 4.5 mm, and then it was evaluated whether or not cracks occur in the plastic fastener when the plastic fastener is fitted while installing the cable. If there were cracks observed in either a fitting portion of the plastic fastener or an inner spring, the plastic fastener was evaluated to have cracks. The ratio of the number of molded plastic fastener articles which had cracks when fitted while installing the cable to all 30 molded plastic fastener articles is hereinafter referred to as a crack ratio (%) when fitted while installing the cable. This ratio was used as an index of initial toughness. The lower the above-mentioned crack ratio was, the more excellent the initial toughness of the molded plastic fastener article became.

Evaluation of High-Temperature Long-Term Durability of Plastic Fastener when Fitted while Installing Wiring The molded plastic fastener article which had no crack observed when fitted while installing the cable, as mentioned in the preceding paragraph, was subjected to a treatment (high-temperature long-term durability treatment) in an atmosphere at 165° C. for 1,000 hours, and then it was evaluated whether or not cracks occur in a fitting portion of the molded plastic fastener article obtained after this treatment was evaluated in the same manner as that mentioned above. The ratio of the number of molded plastic fastener articles with cracks after the high-temperature long-term durability treatment to the number of molded plastic fastener articles which were not observed to have cracks when fitted while installing the cable as mentioned in the preceding paragraph is hereinafter referred to as a crack ratio (%) after a treatment at 165° C. for 1,000 hours. This ratio was used as an index of high-temperature long-term durability. The lower the above-mentioned crack ratio was, the more excellent the high-temperature long-term durability of the molded plastic fastener article became.

Number Average Dispersion Particle Diameter of Island Phase

The number average dispersion particle diameter of the island phase of at least one resin selected from a polyetherimide resin, a polyether sulfone resin and a fluororesin of the PPS resin composition was calculated by the following method. Pellets of the PPS resin composition were cut to cut out thin pieces having a size of 0.1 μm or less, which were photographed using a transmission electron microscope at a magnification of about 1,000 to 5,000 times. From the thus obtained photographs, first, a maximum diameter and a minimum diameter of each dispersed phase were measured for any 100 dispersed phases, and an average of the maximum diameter and the minimum diameter of each dispersed phase was regarded as a diameter of each dispersed phase. A value obtained by number-averaging the diameters of 100 dispersed phases was regarded as a number average dispersed diameter of the island phase.

Reference Example 1 Preparation of PPS Resin (PPS-1)

In a 70 liter autoclave equipped with a stirrer, 8,267.37 g (70.00 mol) of 47.5% sodium hydrosulfide, 2,957.21 g (70.97 mol) of 96% sodium hydroxide, 11,434.50 g (115.50 mol) of N-methyl-2-pyrrolidone (NMP), 2,583.00 g (31.50 mol) of sodium acetate, and 10,500 g of deionized water were charged. After gradually heating a reaction vessel to 245° C. over about 3 hours while passing through nitrogen under a normal pressure, 14,780.1 g of water and 280 g of NMP were distilled out and the reaction vessel was cooled to 160° C. The amount of moisture remaining in the system based on 1 mol of the alkali metal sulfide charged was 1.06 mol, including moisture consumed for hydrolysis of NMP. The scattering amount of hydrogen sulfide was 0.02 mol based on 1 mol of the alkali metal sulfide charged.

To this reaction mixture, 10,235.46 g (69.63 mol) of p-dichlorobenzene, 0.55 g (0.003 mol) of 1,2,4-trichlorobenzene and 9,009.00 g (91.00 mol) of NMP were added and the reaction vessel was sealed under a nitrogen gas, and then the temperature was raised to 238° C. at a rate of 0.6° C./min while stirring at 240 rpm. After reacting at 238° C. for 95 minutes, the temperature was raised to 270° C. at a rate of 0.8° C./min. After reacting at 270° C. for 100 minutes, the reaction mixture was cooled to 250° C. at a rate of 1.3° C./min while injecting 1260 g (70 mol) of water over 15 minutes. Subsequently, the reaction mixture was cooled to 200° C. at a rate of 1.0° C./min, followed by rapid cooling to around room temperature.

The contents were taken out from the reaction vessel, diluted with 26,300 g of NMP and a solvent and solids were filtered through a sieve (80 mesh), and then particles thus obtained were washed with 31,900 g of NMP and filtered. The particles were washed several times with 56,000 g of deionized water and filtered, and then washed with 70,000 g of a 0.05% by weight aqueous calcium acetate solution and filtered. After washing with 70,000 g of deionized water and filtering, hydrous PPS particles thus obtained were subjected to hot-air drying at 80° C. and then dried under reduced pressure at 120° C. PPS-1 thus obtained had a melt viscosity of 230 Pa·s (at 300° C. and a shear rate of 1,000/sec) and a number average molecular weight of 16,000.

Reference Example 2 Preparation of PPS Resin (PPS-2)

In a 70 liter autoclave equipped with a stirrer, 8,267.37 g (70.00 mol) of 47.5% sodium hydrosulfide, 96% sodium hydroxide 2,957.21 g (70.63 mol), 11,434.50 g (147.00 mol) of N-methyl-2-pyrrolidone (NMP), 2,583.00 g (31.50 mol) of sodium acetate, and 10,500 g of deionized water were charged. After gradually heating to 245° C. over about 3 hours while passing through nitrogen under a normal pressure, 14,780.1 g of water and 280 g of NMP were distilled out and the reaction vessel was cooled to 200° C. The amount of moisture remaining in the system based on 1 mol of the alkali metal hydrosulfide charged was 1.06 mol, including moisture consumed for hydrolysis of NMP. The scattering amount of hydrogen sulfide was 0.02 mol based on 1 mol of the alkali metal sulfide charged.

Subsequently, the reaction vessel was cooled to 160° C. and 10,235.46 g (69.63 mol) of p-dichlorobenzene (p-DCB) and 9,009.00 g (91.00 mol) of NMP were added. The reaction vessel was sealed under a nitrogen gas and the temperature was raised from 200° C. to 238° C. at a rate of 0.6° C./min while stirring at 240 rpm, followed by a reaction at 238° C. for 95 minutes. Subsequently, the temperature was raised to 270° C. at a rate of 0.8° C./min. After reacting at 270° C. for 100 minutes, 1,260 g (70 mol) of water was injected while cooling to 250° C. at a rate of 1.3° C./min over 15 minutes. Subsequently, the reaction mixture was cooled to 200° C. at a rate of 1.0° C./min, followed by rapid cooling to around room temperature. The contents were taken out from the reaction vessel, diluted with 35 liters of NMP and a solvent and solids were filtered through an 80 mesh wire mesh (opening of 0.175 mm), and then solids thus obtained were similarly washed with 35 liters of NMP and filtered. The following operation was repeated three times in total: Solids thus obtained were diluted with 70 liters of deionized water and, after stirring at 70° C. for 30 minutes, solids were recovered by filtering through an 80 mesh wire mesh. Subsequently, 70,000 g of a 0.05% by weight aqueous acetic acid solution was added to solids thus obtained, followed by stirring at 70° C. for 30 minutes and further filtration through 80 mesh wire mesh. After adding 70,000 g of deionized water, stirring, washing and filtration were performed under the same conditions. These hydrous PPS particles were subjected to hot-air drying at 80° C. and then dried under reduced pressure at 120° C. to obtain PPS-2. PPS-2 thus obtained finally had a melt viscosity of 200 Pa·s (at 300° C. and a shear rate of 1,000/sec) and a number average molecular weight of 16,000.

Reference Example 3 Preparation of PPS Resin (PPS-3)

In a 70 liter autoclave equipped with a stirrer, 8,267.37 g (70.00 mol) of 47.5% sodium hydrosulfide, 96% sodium hydroxide 2,923.88 g (70.17 mol), 11,434.50 g (115.50 mol) of N-methyl-2-pyrrolidone (NMP), 1,894.20 g (23.10 mol) of sodium acetate, and 10,500 g of deionized water were charged. After gradually heating to 230° C. over about 3 hours while passing through nitrogen under a normal pressure, 14,780.1 g of water and 280 g of NMP were distilled out and the reaction vessel was cooled to 160° C. The amount of moisture remaining in the system based on 1 mol of the alkali metal sulfide charged was 1.06 mol, including moisture consumed for hydrolysis of NMP. The scattering amount of hydrogen sulfide was 0.017 mol based on 1 mol of the alkali metal sulfide charged.

To this reaction mixture, 10,458.90 g (71.15 mol) of p-dichlorobenzene and 9,078.30 g (91.70 mol) of NMP were added and the reaction vessel was sealed under a nitrogen gas, and then the temperature was raised to 240° C. at a rate of 0.6° C./min while stirring at 240 rpm. After reacting at 240° C. for 40 minutes, the temperature was raised to 275° C. at a rate of 0.8° C./min. Subsequently, 2,394 g (133 mol) of deionized water was injected into the autoclave while cooling to 250° C. at a rate of 1.3° C./min. Subsequently, the reaction mixture was cooled to 200° C. at a rate of 1.0° C./min, followed by rapid cooling to around room temperature.

The contents were taken out from the reaction vessel, diluted with 26,300 g of NMP and a solvent and solids were filtered through a sieve (80 mesh), and then particles thus obtained were washed with 31,900 g of NMP and filtered. The particles were washed several times with 56,000 g of deionized water and filtered, and then washed with 70,000 g of a 0.05% by weight aqueous calcium acetate solution and filtered. After washing with 70,000 g of deionized water and filtering, hydrous PPS particles thus obtained were subjected to hot-air drying at 80° C. and then dried under reduced pressure at 120° C. PPS-3 thus obtained had a melt viscosity of 100 Pa s (at 300° C. and a shear rate of 1,000/sec) and a number average molecular weight of 12,000.

Reference Example 4 Preparation of PPS Resin (PPS-4)

In a 70 liter autoclave equipped with a stirrer, 8,267.37 g (70.00 mol) of 47.5% sodium hydrosulfide, 96% sodium hydroxide 2,962.50 g (71.10 mol), 11,434.50 g (115.50 mol) of N-methyl-2-pyrrolidone (NMP), 516.60 g (6.30 mol) of sodium acetate, and 10,500 g of deionized water were charged. After gradually heating to 230° C. over about 3 hours while passing through nitrogen under a normal pressure, 14,780.1 g of water and 280 g of NMP were distilled out and the reaction vessel was cooled to 160° C. The amount of moisture remaining in the system based on 1 mol of the alkali metal sulfide charged was 1.06 mol, including moisture consumed for hydrolysis of NMP. The scattering amount of hydrogen sulfide was 0.017 mol based on 1 mol of the alkali metal sulfide charged.

To this reaction mixture, 10,363.50 g (70.50 mol) of p-dichlorobenzene and 9,078.30 g (91.70 mol) of NMP were added and the reaction vessel was sealed under a nitrogen gas, and then the temperature was raised to 270° C. at a rate of 0.6° C./min while stirring at 240 rpm, followed by retaining at 270° C. for 120 minutes. Subsequently, 2,520 g (140 mol) of deionized water was injected into the autoclave while cooling to 250° C. at a rate of 1.3° C./min. Subsequently, the reaction mixture was cooled to 200° C. at a rate of 1.0° C./min, followed by rapid cooling to around room temperature.

The contents were taken out from the reaction vessel, diluted with 26,300 g of NMP and a solvent and solids were filtered through a sieve (80 mesh), and then particles thus obtained were washed with 31,900 g of NMP and filtered. The particles were washed several times with 56,000 g of deionized water and filtered, and then washed with 70,000 g of a 0.05% by weight aqueous acetic acid solution and filtered. After washing with 70,000 g of deionized water and filtering, hydrous PPS particles thus obtained were subjected to hot-air drying at 80° C. and then dried under reduced pressure at 120° C. PPS-4 thus obtained had a melt viscosity of 45 Pa·s (at 300° C. and a shear rate of 1,000/sec) and a number average molecular weight of 9,000.

Other Materials

Organosilane compound-1: 3-isocyanatepropyltriethoxysilane ("KBE9007", manufactured by Shin-Etsu Silicone Co., Ltd.)

Organosilane compound-2: 2-(3,4-epoxycyclohexyl)ethyltrimethoxysilane ("KBM303", manufactured by Shin-Etsu Silicone Co., Ltd.)

Metal salt of phosphorus oxoacid-1: "sodium phosphinate monohydrate" manufactured by Wako Pure Chemical Industries, Ltd.

Metal salt of phosphorus oxoacid-2: "calcium phosphinate" manufactured by Wako Pure Chemical Industries, Ltd.

Other phosphorus-containing compounds: 3,9-bis(2,6-di-t-butyl-4-methylphenoxy)2,4,8,10-tetraoxa-3,9-diphosphaspiro[5.5]undecane (Chemical Formula 20), "PEP-36" manufactured by ADEKA CORPORATION Chemical Formula 20

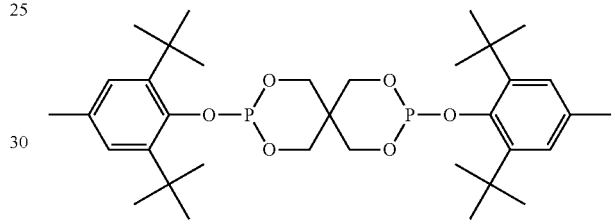

Polyetherimide resin-1: "Ultem1000" manufactured by SABIC INNOVATIVE PLASTICS LIMITED Polyetherimide resin-2: "Siltem1500" manufactured by SABIC INNOVATIVE PLASTICS LIMITED Polyethersulfone resin: "SUMIKAEXCEL SE4800G" manufactured by Sumitomo Chemical Company, Limited Fluororesin: "AH2000" manufactured by AGC Inc.

Inorganic filler: glass chopped strand "ECS 03 T-757H" manufactured by Nippon Electric Glass Co., Ltd.

Examples 1 to 12, Comparative Examples 6 to 9

A PPS resin, an organosilane compound and a metal salt of phosphorus oxoacid were dry-blended in the proportion shown in Tables 1 to 3, charged in a twin-screw extruder, melt-kneaded and then pelletized by a strand cutter. As the twin-screw extruder, a TEX30α type twin-screw extruder equipped with a vacuum vent (manufactured by The Japan Steel Works, LTD.: L/D=30) was used. A screw arrangement used is a screw arrangement in which the number of kneading sections is 3, a ratio of the kneading sections to the screw length: 30%, the number of stirring screw sections with cutouts is 2, and a ratio of the stirring screw sections with cutouts to the screw length: 10%. As temperature setting of the twin-screw extruder, of eleven cylinder blocks, the temperature of two cylinder blocks in contact with a die tip was set at 300° C., and the temperature of other nine cylinder blocks (Tc: cylinder temperature) was set at 280° C. The melt-kneading method under these conditions is taken as a method A. Pellets thus obtained were dried at 130° C. overnight and subjected to injection molding, and then the molded article thus obtained was subjected to evaluation of a tensile elongation at break before and after a dry heat treatment, a stress retention rate at a tensile elongation of 20% by the above-mentioned method. The results are as shown in Tables 1 to 3.

Examples 13, 14

In the same manner as in Example 1, except that, in addition to the PPS resin, the organosilane compound and the metal salt of phosphorus oxoacid, a polyetherimide resin was dry-blended in the proportion shown in Table 2, melt-kneading, pelletization and the evaluation of various properties were performed. The results are as shown in Table 2.

Example 15

In the same manner as in Example 1, except that, in addition to the PPS resin, the organosilane compound and the metal salt of phosphorus oxoacid, a polyethersulfone resin was dry-blended in the proportion shown in Table 2, melt-kneading, pelletization and the evaluation of various properties were performed. The results are as shown in Table 2.

Example 16

In the same manner as in Example 1, except that, in addition to the PPS resin, the organosilane compound and the metal salt of phosphorus oxoacid, a fluororesin was dry-blended in the proportion shown in Table 2, melt-kneading, pelletization and the evaluation of various properties were performed. The results are as shown in Table 2.

Comparative Example 1

In the same manner as in Example 1, except that only the PPS resin was used, melt-kneading, pelletization and the evaluation of various properties were performed. The results are as shown in Table 3.

Comparative Examples 2 to 3

In the same manner as in Example 1, except that the organosilane compound was not used, melt-kneading, pelletization and the evaluation of various properties were performed. The results are as shown in Table 3.

Comparative Examples 4 to 5

In the same manner as in Example 1, except that the metal salt of phosphorus oxoacid was not used, melt-kneading, pelletization and the evaluation of various properties were performed. The results are as shown in Table 3.

Comparative Example 10

In the same manner as in Example 1, except that, in addition to the PPS resin, the organosilane compound and the metal salt of phosphorus oxoacid, an inorganic filler was dry-blended in the proportion shown in Table 3, melt-kneading, pelletization and the evaluation of various properties were performed. The results are as shown in Table 3.

Comparative Example 11

In the same manner as in Example 1, except that other phosphorus-containing compounds were dry-blended in the proportion shown in Table 3 in place of the metal salt of phosphorus oxoacid, melt-kneading, pelletization and the evaluation of various properties were performed. The results are as shown in Table 3.

Comparative Example 12

In the same manner as in Example 14, except for using, as the screw arrangement, a screw arrangement in which the number of kneading sections is 1, a ratio of the kneading sections to the screw length is 5%, the number of stirring screw sections with cutouts is 0, and a ratio of the stirring screw sections with cutouts to the screw length is 0%, melt-kneading, pelletization and the evaluation of various properties were performed. A melt-kneading method under these conditions is taken as a method B. The results are as shown in Table 3.

TABLE 1

| | | | | Example 1 | Example 2 | Example 3 | Example 4 | Example 5 |
|---|---|---|---|---|---|---|---|---|
| Composition | PPS resin | PPS-1 | Parts by weight | | | 100 | 100 | 100 |
| | | PPS-2 | Parts by weight | | | | | |
| | | PPS-3 | Parts by weight | | 100 | | | |
| | | PPS-4 | Parts by weight | 100 | | | | |
| | Organosilane compound-1 | | Parts by weight | 1 | 1 | 1 | 8 | 1 |
| | Organosilane compound-2 | | Parts by weight | | | | | |
| | Metal salt of phosphorus oxoacid-1 | | Parts by weight | 0.2 | 0.2 | 0.2 | 0.2 | 0.5 |
| | Metal salt of phosphorus oxoacid-2 | | Parts by weight | | | | | |
| | Other phosphorus-containing compounds | | Parts by weight | | | | | |
| | Polyetherimide resin-1 | | Parts by weight | | | | | |
| | Polyetherimide resin-2 | | Parts by weight | | | | | |
| | Polyethersulfone resin | | Parts by weight | | | | | |
| | Fluororesin | | Parts by weight | | | | | |
| | Inorganic filler | | Parts by weight | | | | | |
| | Melt-kneading method | | | A | A | A | A | A |
| Physical properties of composition | Number average molecular weight Mn of PPS resin | | | 9000 | 12000 | 16,000 | 16,000 | 16,000 |
| | Non-Newtonian index of PPS resin composition | | | 1.74 | 2.07 | 1.78 | 1.8 | 2.2 |
| | Melt viscosity of PPS resin composition | Initial | Pa · s | 520 | 460 | 390 | 500 | 495 |
| | | 200° C. × 700 hours | Pa · s | 600 | 480 | 500 | 660 | 580 |
| | Melt viscosity ratio before and after long-term dry heat treatment | | % | 115 | 104 | 128 | 132 | 117 |
| | Dispersion state | Number average dispersion particle diameter of island phase | nm | — | — | — | — | — |

TABLE 1-continued

| Properties of dumbbell | Stress retention rate | | % | 90 | 92 | 92 | 94 | 100 |
|---|---|---|---|---|---|---|---|---|
| | Tensile elongation at break | Initial | % | 41 | 70 | 65 | 85 | 86 |
| | | 200° C. × 500 hours | % | 10 | 12 | 12 | 11 | 18 |
| | | 200° C. × 700 hours | % | 7 | 8 | 8 | 7 | 15 |
| Properties of plastic fastener | Initial toughness (Crack ratio (%) when fitted while installing cable) | | % | 17 | 7 | 0 | 3 | 0 |
| | High-temperature long-term durability (Crack ratio after treatment of 165° C. × 1,000 hours) | | % | 23 | 17 | 17 | 13 | 0 |

| | | | | Example 6 | Example 7 | Example 8 | Example 9 |
|---|---|---|---|---|---|---|---|
| Composition | PPS resin | PPS-1 | Parts by weight | 100 | | | |
| | | PPS-2 | Parts by weight | | 100 | 100 | 100 |
| | | PPS-3 | Parts by weight | | | | |
| | | PPS-4 | Parts by weight | | | | |
| | Organosilane compound-1 | | Parts by weight | 1 | 1 | 1 | 1 |
| | Organosilane compound-2 | | Parts by weight | | | | |
| | Metal salt of phosphorus oxoacid-1 | | Parts by weight | 3.5 | 0.1 | 0.2 | 0.5 |
| | Metal salt of phosphorus oxoacid-2 | | Parts by weight | | | | |
| | Other phosphorus-containing compounds | | Parts by weight | | | | |
| | Polyetherimide resin-1 | | Parts by weight | | | | |
| | Polyetherimide resin-2 | | Parts by weight | | | | |
| | Polyethersulfone resin | | Parts by weight | | | | |
| | Fluororesin | | Parts by weight | | | | |
| | Inorganic filler | | Parts by weight | | | | |
| | Melt-kneading method | | | A | A | A | A |
| Physical properties of composition | Number average molecular weight Mn of PPS resin | | | 16,000 | 16,000 | 16,000 | 16,000 |
| | Non-Newtonian index of PPS resin composition | | | 2.01 | 1.70 | 1.82 | 1.77 |
| | Melt viscosity of PPS resin composition | Initial | Pa · s | 480 | 450 | 450 | 360 |
| | | 200° C. × 700 hours | Pa · s | 720 | 470 | 580 | 530 |
| | Melt viscosity ratio before and after long-term dry heat treatment | | % | 150 | 104 | 129 | 147 |
| | Dispersion state | Number average dispersion particle diameter of island phase | nm | — | — | — | — |
| Properties of dumbbell | Stress retention rate | | % | 94 | 91 | 99 | 95 |
| | Tensile elongation at break | Initial | % | 73 | 58 | 75 | 69 |
| | | 200° C. × 500 hours | % | 13 | 10 | 18 | 10 |
| | | 200° C. × 700 hours | % | 10 | 7 | 12 | 8 |
| Properties of plastic fastener | Initial toughness (Crack ratio (%) when fitted while installing cable) | | % | 7 | 0 | 0 | 0 |
| | High-temperature long-term durability (Crack ratio after treatment of 165° C. × 1,000 hours) | | % | 23 | 13 | 0 | 23 |

TABLE 2

| | | | | Example 10 | Example 11 | Example 12 | Example 13 |
|---|---|---|---|---|---|---|---|
| Composition | PPS resin | PPS-1 | Parts by weight | 100 | 100 | 100 | 100 |
| | | PPS-2 | Parts by weight | | | | |
| | | PPS-3 | Parts by weight | | | | |
| | | PPS-4 | Parts by weight | | | | |
| | Organosilane compound-1 | | Parts by weight | | | 1 | 1 |
| | Organosilane compound-2 | | Parts by weight | 1 | 1 | | |
| | Metal salt of phosphorus oxoacid-1 | | Parts by weight | 0.2 | 0.5 | | 0.2 |
| | Metal salt of phosphorus oxoacid-2 | | Parts by weight | | | 0.2 | |
| | Other phosphorus-containing compounds | | Parts by weight | | | | |
| | Polyetherimide resin-1 | | Parts by weight | | | | 10 |
| | Polyetherimide resin-2 | | Parts by weight | | | | |
| | Polyethersulfone resin | | Parts by weight | | | | |
| | Fluororesin | | Parts by weight | | | | |
| | Inorganic filler | | Parts by weight | | | | |
| | Melt-kneading method | | | A | A | A | A |
| Physical properties of composition | Number average molecular weight Mn of PPS resin | | | 16,000 | 16,000 | 16,000 | 16,000 |
| | Non-Newtonian index of PPS resin composition | | | 1.88 | 1.66 | 1.57 | 1.78 |
| | Melt viscosity of PPS resin composition | Initial | Pa · s | 410 | 310 | 460 | 435 |
| | | 200° C. × 700 hours | Pa · s | 580 | 520 | 470 | 600 |
| | Melt viscosity ratio before and after long-term dry heat treatment | | % | 141 | 168 | 102 | 138 |
| | Dispersion state | Number average dispersion particle diameter of island phase | nm | — | — | — | 100 |
| Properties of dumbbell | Stress retention rate | | % | 96 | 88 | 96 | 96 |
| | Tensile elongation at break | Initial | % | 46 | 70 | 43 | 81 |
| | | 200° C. × 500 hours | % | 15 | 10 | 10 | 19 |
| | | 200° C. × 700 hours | % | 11 | 7 | 8 | 16 |

TABLE 2-continued

| Properties of plastic fastener | Initial toughness (Crack ratio (%) when fitted while installing cable) | % | 0 | 7 | 0 | 0 |
|---|---|---|---|---|---|---|
| | High-temperature long-term durability (Crack ratio after treatment of 165° C. × 1,000 hours) | % | 10 | 23 | 27 | 0 |

| | | | | | Example 14 | Example 15 | Example 16 |
|---|---|---|---|---|---|---|---|
| Composition | PPS resin | PPS-1 | Parts by weight | | 100 | 100 | 100 |
| | | PPS-2 | Parts by weight | | | | |
| | | PPS-3 | Parts by weight | | | | |
| | | PPS-4 | Parts by weight | | | | |
| | Organosilane compound-1 | | Parts by weight | | 1 | 1 | 1 |
| | Organosilane compound-2 | | Parts by weight | | | | |
| | Metal salt of phosphorus oxoacid-1 | | Parts by weight | | 0.2 | 0.2 | 0.2 |
| | Metal salt of phosphorus oxoacid-2 | | Parts by weight | | | | |
| | Other phosphorus-containing compounds | | Parts by weight | | | | |
| | Polyetherimide resin-1 | | Parts by weight | | | | |
| | Polyetherimide resin-2 | | Parts by weight | | 10 | | |
| | Polyethersulfone resin | | Parts by weight | | | 10 | |
| | Fluororesin | | Parts by weight | | | | 10 |
| | Inorganic filler | | Parts by weight | | | | |
| Physical properties of composition | Melt-kneading method | | | | A | A | A |
| | Number average molecular weight Mn of PPS resin | | | | 16,000 | 16,000 | 16,000 |
| | Non-Newtonian index of PPS resin composition | | | | 1.84 | 1.81 | 1.91 |
| | Melt viscosity of PPS resin composition | Initial | Pa · s | | 420 | 390 | 335 |
| | | 200° C. × 700 hours | Pa · s | | 580 | 560 | 470 |
| | Melt viscosity ratio before and after long-term dry heat treatment | | % | | 138 | 144 | 140 |
| | Dispersion state | Number average dispersion particle diameter of island phase | nm | | 95 | 85 | 290 |
| Properties of dumbbell | Stress retention rate | | % | | 98 | 99 | 96 |
| | Tensile elongation at break | Initial | % | | 74 | 81 | 70 |
| | | 200° C. × 500 hours | % | | 22 | 21 | 21 |
| | | 200° C. × 700 hours | % | | 20 | 19 | 20 |
| Properties of plastic fastener | Initial toughness (Crack ratio (%) when fitted while installing cable) | | % | | 0 | 0 | 0 |
| | High-temperature long-term durability (Crack ratio after treatment of 165° C. × 1,000 hours) | | % | | 0 | 0 | 0 |

TABLE 3

| | | | | | Comparative Example 1 | Comparative Example 2 | Comparative Example 3 |
|---|---|---|---|---|---|---|---|
| Composition | PPS resin | PPS-1 | Parts by weight | | 100 | 100 | |
| | | PPS-2 | Parts by weight | | | | 100 |
| | | PPS-3 | Parts by weight | | | | |
| | | PPS-4 | Parts by weight | | | | |
| | Organosilane compound-1 | | Parts by weight | | | | |
| | Organosilane compound-2 | | Parts by weight | | | | |
| | Metal salt of phosphorus oxoacid-1 | | Parts by weight | | | 0.2 | 0.2 |
| | Metal salt of phosphorus oxoacid-2 | | Parts by weight | | | | |
| | Other phosphorus-containing compounds | | Parts by weight | | | | |
| | Polyetherimide resin-1 | | Parts by weight | | | | |
| | Polyetherimide resin-2 | | Parts by weight | | | | |
| | Polyethersulfone resin | | Parts by weight | | | | |
| | Fluororesin | | Parts by weight | | | | |
| | Inorganic filler | | Parts by weight | | | | |
| Physical properties of composition | Melt-kneading method | | | | A | A | A |
| | Number average molecular weight Mn of PPS resin | | | | 16,000 | 16,000 | 16,000 |
| | Non-Newtonian index of PPS resin composition | | | | 1.42 | 1.37 | 1.26 |
| | Melt viscosity of PPS resin composition | Initial | Pa · s | | 234 | 150 | 190 |
| | | 200° C. × 700 hours | Pa · s | | 440 | 420 | 940 |
| | Melt viscosity ratio before and after long-term dry heat treatment | | % | | 188 | 280 | 495 |
| | Dispersion state | Number average dispersion particle diameter of island phase | nm | | — | — | — |
| Properties of dumbbell | Stress retention rate | | % | | 71 | 71 | 70 |
| | Tensile elongation at break | Initial | % | | 28 | 31 | 22 |
| | | 200° C. × 500 hours | % | | 5 | 3 | 4 |
| | | 200° C. × 700 hours | % | | 4 | 3 | 3 |

TABLE 3-continued

| | | | | | | |
|---|---|---|---|---|---|---|
| Properties of plastic fastener | Initial toughness (Crack ratio when fitted while installing cable) | | % | 60 | 73 | 57 |
| | High-temperature long-term durability (Crack ratio after treatment of 165° C. × 1,000 hours) | | % | 100 | 100 | 100 |

| | | | | Comparative Example 4 | Comparative Example 5 | Comparative Example 6 |
|---|---|---|---|---|---|---|
| Composition | PPS resin | PPS-1 | Parts by weight | 100 | | 100 |
| | | PPS-2 | Parts by weight | | 100 | |
| | | PPS-3 | Parts by weight | | | |
| | | PPS-4 | Parts by weight | | | |
| | Organosilane compound-1 | | Parts by weight | 1 | 1 | 1 |
| | Organosilane compound-2 | | Parts by weight | | | |
| | Metal salt of phosphorus oxoacid-1 | | Parts by weight | | | 0.005 |
| | Metal salt of phosphorus oxoacid-2 | | Parts by weight | | | |
| | Other phosphorus-containing compounds | | Parts by weight | | | |
| | Polyetherimide resin-1 | | Parts by weight | | | |
| | Polyetherimide resin-2 | | Parts by weight | | | |
| | Polyethersulfone resin | | Parts by weight | | | |
| | Fluororesin | | Parts by weight | | | |
| | Inorganic filler | | Parts by weight | | | |
| | Melt-kneading method | | | A | A | A |
| Physical properties of composition | Number average molecular weight Mn of PPS resin | | | 16,000 | 16,000 | 16,000 |
| | Non-Newtonian index of PPS resin composition | | | 1.72 | 1.71 | 1.73 |
| | Melt viscosity of PPS resin composition | Initial | Pa · s | 300 | 460 | 330 |
| | | 200° C. × 700 hours | Pa · s | 480 | 740 | 520 |
| | Melt viscosity ratio before and after long-term dry heat treatment | | % | 160 | 161 | 158 |
| | Dispersion state | Number average dispersion particle diameter of island phase | nm | — | — | — |
| Properties of dumbbell | Stress retention rate | | % | 85 | 86 | 82 |
| | Tensile elongation at break | Initial | % | 39 | 54 | 36 |
| | | 200° C. × 500 hours | % | 5 | 6 | 5 |
| | | 200° C. × 700 hours | % | 4 | 4 | 3 |
| Properties of plastic fastener | Initial toughness (Crack ratio when fitted while installing cable) | | % | 0 | 0 | 0 |
| | High-temperature long-term durability (Crack ratio after treatment of 165° C. × 1,000 hours) | | % | 53 | 70 | 60 |

| | | | | Comparative Example 7 | Comparative Example 8 | Comparative Example 9 |
|---|---|---|---|---|---|---|
| Composition | PPS resin | PPS-1 | Parts by weight | 100 | 100 | 100 |
| | | PPS-2 | Parts by weight | | | |
| | | PPS-3 | Parts by weight | | | |
| | | PPS-4 | Parts by weight | | | |
| | Organosilane compound-1 | | Parts by weight | 0.005 | 1 | 12 |
| | Organosilane compound-2 | | Parts by weight | | | |
| | Metal salt of phosphorus oxoacid-2 | | Parts by weight | 0.2 | 7 | 0.2 |
| | Other phosphorus-containing compounds | | Parts by weight | | | |
| | Polyetherimide resin-1 | | Parts by weight | | | |
| | Polyetherimide resin-2 | | Parts by weight | | | |
| | Polyethersulfone resin | | Parts by weight | | | |
| | Fluororesin | | Parts by weight | | | |
| | Inorganic filler | | Parts by weight | | | |
| | Melt-kneading method | | | A | A | A |
| Physical properties of composition | Number average molecular weight Mn of PPS resin | | | 16,000 | 16,000 | 16,000 |
| | Non-Newtonian index of PPS resin composition | | | 1.38 | 1.68 | Impossible to measure |
| | Melt viscosity of PPS resin composition | Initial | Pa · s | 160 | 380 | |
| | | 200° C. × 700 hours | Pa · s | 450 | 780 | |
| | Melt viscosity ratio before and after long-term dry heat treatment | | % | 281 | 205 | — |
| | Dispersion state | Number average dispersion particle diameter of island phase | nm | — | — | — |
| Properties of dumbbell | Stress retention rate | | % | 70 | 80 | Impossible to mold |
| | Tensile elongation at break | Initial | % | 20 | 42 | |
| | | 200° C. × 500 hours | % | 5 | 4 | |
| | | 200° C. × 700 hours | % | 4 | 3 | |
| Properties of plastic fastener | Initial toughness (Crack ratio when fitted while installing cable) | | % | 87 | 100 | |
| | High-temperature long-term durability (Crack ratio after treatment of 165° C. × 1,000 hours) | | % | 100 | 100 | |

TABLE 3-continued

|  |  |  |  | Comparative Example 10 | Comparative Example 11 | Comparative Example 12 |
|---|---|---|---|---|---|---|
| Composition | PPS resin | PPS-1 | Parts by weight | 100 | 100 | 100 |
|  |  | PPS-2 | Parts by weight |  |  |  |
|  |  | PPS-3 | Parts by weight |  |  |  |
|  |  | PPS-4 | Parts by weight |  |  |  |
|  | Organosilane compound-1 |  | Parts by weight | 1 | 1 | 1 |
|  | Organosilane compound-2 |  | Parts by weight |  |  |  |
|  | Metal salt of phosphorus oxoacid-1 |  | Parts by weight | 0.2 |  | 0.2 |
|  | Metal salt of phosphorus oxoacid-2 |  | Parts by weight |  |  |  |
|  | Other phosphorus-containing compounds |  | Parts by weight |  | 0.2 |  |
|  | Polyetherimide resin-1 |  | Parts by weight |  |  | 10 |
|  | Polyetherimide resin-2 |  | Parts by weight |  |  |  |
|  | Polyethersulfone resin |  | Parts by weight |  |  |  |
|  | Fluororesin |  | Parts by weight |  |  |  |
|  | Inorganic filler |  | Parts by weight | 10 |  |  |
|  | Melt-kneading method |  |  | A | A | B |
| Physical properties of composition | Number average molecular weight Mn of PPS resin |  |  | 16,000 | 16,000 | 16,000 |
|  | Non-Newtonian index of PPS resin composition |  |  | — | 1.53 | 1.73 |
|  | Melt viscosity of PPS resin composition | Initial | Pa · s | — | 300 | 330 |
|  |  | 200° C. × 700 hours | Pa · s | — | 490 | 650 |
|  | Melt viscosity ratio before and after long-term dry heat treatment |  | % | — | 163 | 197 |
|  | Dispersion state | Number average dispersion particle diameter of island phase | nm | — | — | 1800 |
| Properties of dumbbell | Stress retention rate |  | % |  | 73 | 90 |
|  | Tensile elongation at break | Initial | % | 4 | 38 | 61 |
|  |  | 200° C. × 500 hours | % | 2 | 5 | 5 |
|  |  | 200° C. × 700 hours | % | 2 | 4 | 4 |
| Properties of plastic fastener | Initial toughness (Crack ratio when fitted while installing cable) |  | % | 100 | 60 | 0 |
|  | High-temperature long-term durability (Crack ratio after treatment of 165° C. × 1,000 hours) |  | % | 100 | 100 | 53 |

Description will be made by comparing the results of the Examples with those of the Comparative Examples.

Examples 1 to 12 exhibited high initial tensile elongation at break and high tensile elongation at break after a dry heat treatment, and exhibited dramatically excellent toughness after a long-term high-temperature heat treatment by melt-kneading a PPS resin and an organic silane compound and a metal salt of phosphorus oxoacid.

Particularly, in Examples 2 to 12, since the PPS resin used has a number average molecular weight of 10,000 or more, a tensile elongation at break before and after a dry heat treatment was improved. FIG. 3 shows a stress-strain curve when a tensile test was performed as mentioned above using an ASTM No. 4 dumbbell obtained by molding the resin composition obtained in Example 3.

In FIG. 3, since the stress at a lower yield point was 77 MPa and the stress at an upper yield point was 84 MPa, a stress retention rate was as follows: (77/84)×100=92(%). As a result, when forming a plastic fastener, a crack ratio when fitted while installing the cable was low. After subjecting a flat electric wire coated with the resin composition obtained in Example 3 to a treatment at 200° C. for 1,000 hours, the number of cracks was 2/50 cm.

Figure 4:
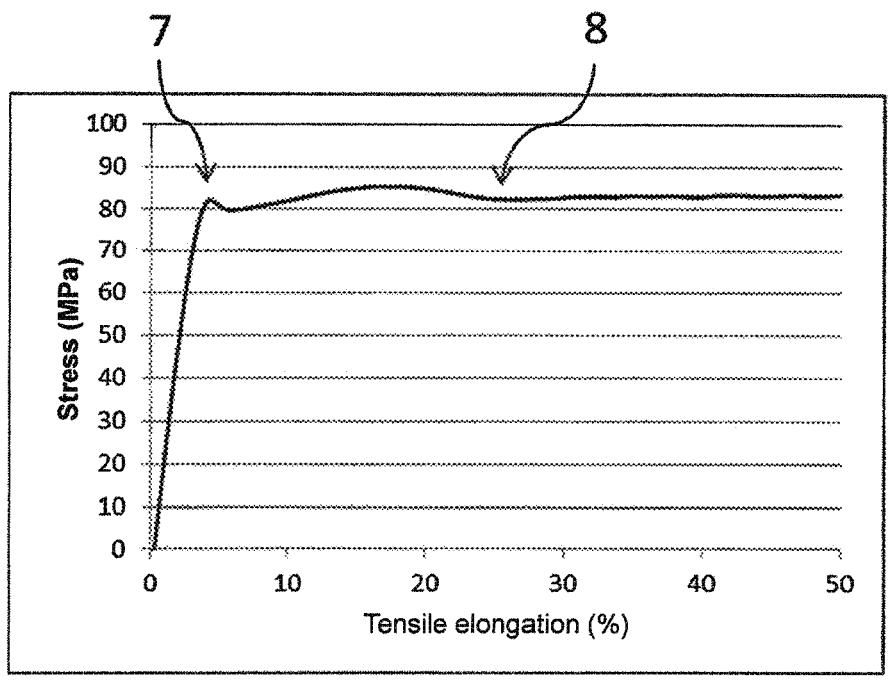
FIG. 4 is a stress-strain curve of a molded article using a composition obtained in Example 6.

In Examples 5, 8 to 10 and 12, since a stress retention rate of the obtained resin composition becomes 95% or more, a tensile elongation at break after a dry heat treatment was particularly high. FIG. 4 shows a stress-strain curve when a tensile test was performed as mentioned above using an ASTM No. 4 dumbbell obtained by molding the resin composition obtained in Example 5.

In FIG. 4, since the stress at a lower yield point was 82 MPa and stress at an upper yield point was 82 MPa, a stress retention rate was as follows: (82/82)×100=100(%). As a result, when forming a plastic fastener, a crack ratio when fitted while installing the cable was as good as 0% and a crack ratio after a high-temperature long-term treatment was low. After subjecting a flat electric wire coated with the resin composition obtained in Example 5 to a treatment at 200° C. for 1,000 hours, the number of cracks was 0/50 cm.

In Examples 5, 8 and 10, since a non-Newtonian index of the obtained resin composition becomes 1.8 to 2.5, a tensile elongation at break after a dry heat treatment was further improved. As a result, when forming a plastic fastener, a crack ratio when fitted while installing the cable was as good as 0 and a crack ratio after a high-temperature long-term treatment was also low.

In Examples 5 and 8, since a melt viscosity ratio before and after a treatment at 200° C. for 700 hours of the obtained resin composition becomes 90 to 135, a tensile elongation at break after a dry heat treatment was further improved. As a result, when forming a plastic fastener, a crack ratio when fitted while installing the cable was as good as 0% and a crack ratio after a high-temperature long-term treatment was 0%, which was most practical.

In Examples 13 to 16, by mixing, in addition to the PPS resin, the organosilane compound and the metal salt of phosphorus oxoacid, a polyetherimide resin, a polyethersulfone resin or a fluororesin, a tensile elongation at break after a dry heat treatment was dramatically improved. As a result, when forming a plastic fastener, a crack ratio when fitted while installing the cable was as good as 0% and a crack ratio after a high-temperature long-term treatment was also 0%. After subjecting a flat electric wire coated with the resin composition obtained in Example 14 to a treatment at 200° C. for 1,000 hours, the number of cracks was 0/50 cm, which was most practical.

Meanwhile, like Comparative Example 1, when the PPS resin is used alone, an initial tensile elongation at break and a tensile elongation at break after a dry heat treatment were very low. As a result, when forming a plastic fastener, a crack ratio when fitted while installing the cable was high and a crack ratio after a high-temperature long-term treatment was 100%, leading to a practical problem.

Figure 5:
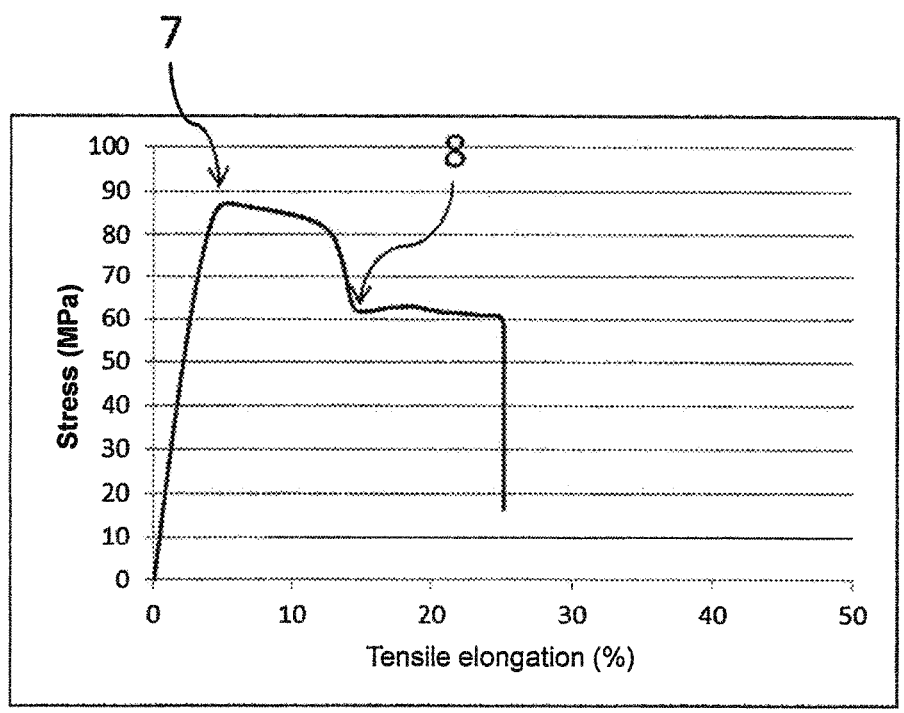
FIG. 5 is a stress-strain curve of a molded article using a composition obtained in Comparative Example 2.

Like Comparative Examples 2 to 3, when the organosilane compound is not mixed, a tensile elongation at break after a dry heat treatment was very low, similarly. FIG. 5 shows a stress-strain curve when a tensile test was performed as mentioned above using an ASTM No. 4 dumbbell obtained by molding the resin composition obtained in Comparative Example 2.

In FIG. 5, since the stress at a lower yield point was 62 MPa and the stress at an upper yield point was 87 MPa, a stress retention rate was very low: (62/87)×100=71(%). As a result, when forming a plastic fastener, a crack ratio when fitted while installing the cable was high and a crack ratio after a high-temperature long-term treatment was 100%, leading to a practical problem. After subjecting a flat electric wire coated with the resin composition obtained in Comparative Example 2 to a treatment at 200° C. for 1,000 hours, the number of cracks was 50/50 cm or more, leading to a practical problem.

Like Comparative Examples 4 to 5, when the metal salt of phosphorus oxoacid is not mixed, even though a stress retention rate sometimes exceeds 80% and is less than 90% at most so that a tensile elongation at break after a dry heat treatment was very low. As a result, when forming a plastic fastener, a crack ratio when fitted while installing the cable was as good as 0%, while a crack ratio after a high-temperature long-term treatment was high, leading to a practical problem.

Like Comparative Example 6, even when the organosilane compound is mixed, if the mixing amount of the metal salt of phosphorus oxoacid is less than 0.01 part by weight, even though a stress retention rate sometimes exceeds 80% and is less than 90% at most, so that a tensile elongation at break after a dry heat treatment was very low. As a result, when forming a plastic fastener, a crack ratio when fitted while installing the cable was as good as 0%, while a crack ratio after a high-temperature long-term treatment was high, leading to a practical problem.

Like Comparative Example 7, even when the metal salt of phosphorus oxoacid is mixed, if the mixing amount of the organosilane compound is less than 0.01 part by weight, a stress retention rate was as low as 70% and a tensile elongation at break after a dry heat treatment was very low. As a result, when forming a plastic fastener, a crack ratio when fitted while installing the cable was very high and a crack ratio after a high-temperature long-term treatment was 100%, leading to a practical problem.

Like Comparative Example 8, even when the organosilane compound is mixed, if the mixing amount of the metal salt of phosphorus oxoacid exceeds 5 parts by weight, microvoids were generated and a tensile elongation at break after a dry heat treatment was very low. As a result, when forming a plastic fastener, both a crack ratio when fitted while installing the cable and a crack ratio after a high-temperature long-term treatment was 100%, leading to a practical problem.

Like Comparative Example 9, even when the metal salt of phosphorus oxoacid is mixed, if the mixing amount of the organosilane compound exceeds 10 parts by weight, significant thickening occurs, thus failing to obtain ASTM No. 4 dumbbell test pieces by injection molding. Similarly, a molded plastic fastener article could not be obtained.

Like Comparative Example 10, when an inorganic filler is mixed, in addition to the organosilane compound and the metal salt of phosphorus oxoacid, a tensile elongation at break after a dry heat treatment was very low. As a result, when forming a plastic fastener, both a crack ratio when fitted while installing the cable and a crack ratio after a high-temperature long-term treatment was 100%, leading to a practical problem.

Like Comparative Example 11, when other phosphorus-containing compounds which are conventional phosphite-based antioxidants were mixed in place of the metal salt of phosphorus oxoacid, a stress retention rate became very low, and thus a tensile elongation at break after a dry heat treatment was also low. As a result, when forming a plastic fastener, both a crack ratio when fitted while installing the cable and a crack ratio after a high-temperature long-term treatment was 100%, leading to a practical problem.

Like Comparative Example 12, when at least one resin selected from a polyetherimide resin, a polyethersulfone resin and a fluororesin is mixed, if the island phase is dispersed with a number average dispersion particle diameter exceeding 1,000 nm, a tensile elongation at break after a dry heat treatment was very low. As a result, when forming a plastic fastener, a crack ratio after a high-temperature long-term treatment tends to increase, leading to a practical problem.

The invention claimed is:

1. A polyphenylene sulfide resin composition obtained by mixing 100 parts by weight of a polyphenlene sulfide resin with 0.01 to 10 parts by weight of an organosilane compound, 0.01 to 5 parts by weight of a metal salt of phosphorus oxoacid, and less than 5 parts by weight of an inorganic filler,
   wherein the polyphenylene sulfide resin has a number average molecular weight of 16,000 or more; and
   a tensile elongation at break, which is measured in accordance with ASTM-D638 under conditions of a tensile speed of 10 mm/min and an ambient temperature of 23° C. after treating at 200° C. for 500 hours using an ASTM No. 4 dumbbell obtained by injection molding the composition, is 10% or more.

2. The polyphenylene sulfide resin composition according to claim 1, wherein the organosilane compound is an alkoxysilane compound having an isocyanate group.

3. The polyphenylene sulfide resin composition according to claim 1, wherein the metal salt of phosphorus oxoacid is a metal salt of phosphinic acid.

4. The polyphenylene sulfide resin composition according to claim 1, wherein a stress retention rate defined by equation (1), which is determined from a stress-strain curve measured in accordance with ASTM-D638 under conditions of a tensile speed of 10 mm/min and an ambient temperature of 23° C. using an ASTM No. 4 dumbbell obtained by injection molding the composition, is 95% or more:

$$\text{stress retention rate} = (\text{stress at lower yield point (MPa)})/(\text{stress at upper yield point (MPa)}) \times 100 \ (\%) \quad (1)$$

wherein the upper yield point is a point at which stress in an elastic deformation area is at a maximum; the lower yield point is a point at which stress in a plastic deformation area starts to change at a constant value; the elastic deformation area is an area where stress first decreases from a start of a test in the stress-strain curve; and the plastic deformation area is an entire area excluding the elastic deformation area in the stress-strain curve.

5. The polyphenylene sulfide resin composition according to claim 1, wherein a non-Newtonian index of the polyphenylene sulfide resin composition calculated from results of a shear stress at a shear rate of 60 to 3,060/sec measured at a temperature of 300° C., is 1.8 to 2.5.

6. The polyphenylene sulfide resin composition according to claim 1, wherein a tensile elongation at break measured in accordance with ASTM-D638 under conditions of a tensile speed of 10 mm/min and an ambient temperature of 23° C. after treating at 200° C. for 500 hours using an ASTM No. 4 dumbbell obtained by injection molding the composition, is 18% or more.

7. The polyphenylene sulfide resin composition according to claim 1, wherein 100 parts by weight of a polyphenylene sulfide resin is further mixed with 1 to 50 parts by weight of at least one resin selected from a polyetherimide resin, a polyethersulfone resin and a fluororesin.

8. The polyphenylene sulfide resin composition according to claim 7, wherein the polyphenylene sulfide resin forms a sea phase, and at least one resin selected from a polyetherimide resin, a polyethersulfone resin and a fluororesin forms an island phase dispersed in the sea phase to have a number average dispersion particle diameter of 1,000 nm or less.

9. A method of producing the polyphenylene sulfide resin composition according to claim 1, which comprises melt-kneading raw materials comprising a polyphenylene sulfide resin, an organosilane compound and a metal salt of phosphorus oxoacid using a twin-screw extruder, wherein a ratio L/D of a screw length L to a screw diameter D in a twin-screw extruder is 10 or more, a screw arrangement includes a stirring screw with cutouts, and a ratio of a total length of a stirring screw section with cutouts to the screw length L is 3 to 20%.

10. A molded article comprising the polyphenylene sulfide resin composition according to claim 1.

11. The molded article according to claim 10, which is an in-vehicle member.

12. The molded article according to claim 11, which is a covering member for an electric wire.

13. The molded article according to claim 11, which is a plastic fastener.

* * * * *